United States Patent
Miyazaki et al.

(10) Patent No.: US 6,802,795 B2
(45) Date of Patent: Oct. 12, 2004

(54) AUTOMATIC TRANSMISSION OF MOTOR VEHICLE

(75) Inventors: Terufumi Miyazaki, Toyota (JP); Tetsuya Kohno, Okazaki (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/427,930

(22) Filed: May 2, 2003

(65) Prior Publication Data

US 2003/0216211 A1 Nov. 20, 2003

(30) Foreign Application Priority Data

May 20, 2002 (JP) .................................. 2002-144616
May 27, 2002 (JP) .................................. 2002-153088
Jun. 3, 2002 (JP) .................................. 2002-162118

(51) Int. Cl.[7] .............................................. F16H 3/62
(52) U.S. Cl. ..................... 475/275; 475/277; 475/278; 475/282
(58) Field of Search ................................ 475/275, 277, 475/278, 282, 283

(56) References Cited

U.S. PATENT DOCUMENTS 5,098,357 A * 3/1992 Asada et al. ................ 475/278
6,053,839 A * 4/2000 Baldwin et al. ............. 475/281
6,558,287 B2 * 5/2003 Hayabuchi et al. .......... 475/271
6,723,018 B2 * 4/2004 Hayabuchi et al. .......... 475/276
2003/0083173 A1 * 5/2003 Miyazaki et al. ........... 475/280

FOREIGN PATENT DOCUMENTS

| JP | 9-126283 | 5/1997 |
| JP | 2000-266138 | 9/2000 |
| JP | 2001-82555 | 3/2001 |
| JP | 2001-182785 | 7/2001 |
| WO | WO 01/04513 A1 | 1/2001 |
| WO | WO 01/27496 A1 | 4/2001 |

* cited by examiner

*Primary Examiner*—Charles A. Marmor
*Assistant Examiner*—David D. Le
(74) *Attorney, Agent, or Firm*—Oblon, Spivak, McClelland, Maier & Neustadt, P.C.

(57) ABSTRACT

An automatic transmission of a motor vehicle includes first, second and third planetary gear sets, two clutches and three brakes. A first-speed gear stage having the largest gear ratio is established when the first clutch and the first brake are engaged, a second-speed gear stage is established when the first clutch and the second brake are engaged, a third-speed gear stage is established when the first clutch and the third brake are engaged, a fourth-speed gear stage is established when the first clutch and the second clutch are engaged, a fifth-speed gear stage is established when the second clutch and the third brake are engaged, a sixth-speed gear stage is established when the second clutch and the second brake are engaged, and a seventh-speed gear stage is established when the second clutch and the first brake are engaged.

10 Claims, 17 Drawing Sheets

FIG. 2

|  | C1 | C2 | B1 | B2 | B3 OR C3 | SPEED RATIO γ | RATIO ($\gamma_n/\gamma_{n+1}$) |
|---|---|---|---|---|---|---|---|
| 1st | O |  | O |  |  | 2.52 | 1.34 |
| 2nd | O |  |  | O |  | 1.88 | 1.39 |
| 3rd | O | O |  |  | O | 1.35 | 1.35 |
| 4th | O | O |  |  |  | 1.00 | 1.20 |
| 5th |  | O |  | O |  | 0.83 | 1.12 |
| 6th |  | O |  |  | O | 0.74 | 1.35 |
| 7th |  | O | O |  |  | 0.55 |  |
| Rev |  |  | O |  | O | 1.65 | GEAR RATIO WIDTH ($\gamma_1/\gamma_7$) 4.61 |

FIG. 6

| | C1 | C2 | C3 | B1 | B2 | SPEED RATIO ($\rho_1=0.36, \rho_2=0.36, \rho_3=0.45$) | RATIO ($\gamma_n/\gamma_{n+1}$) |
|---|---|---|---|---|---|---|---|
| 1st | | | O | O | | 3.90 | |
| 2nd | | | O | | O | 2.64 | 1.48 |
| 3rd | | O | O | | | 1.81 | 1.46 |
| 4th | | O | O | | | 1.20 | 1.51 |
| 5th | O | O | | | | 1.000 | 1.20 |
| 6th | O | | | | O | 0.91 | 1.10 |
| 7th | O | | | O | | 0.65 | 1.40 |
| Rev | | O | | O | | 2.79 | |

OR B3

GEAR RATIO WIDTH $\gamma_1/\gamma_7 = 6.00$

FIG. 16

| | C1 | C2 | C3 | B1 | B2 | SPEED RATIO γ | RATIO (γn/γn+1) |
|---|---|---|---|---|---|---|---|
| 1st | O | | | O | | 3.77 | 1.41 |
| 2nd | O | | | | O | 2.67 | 1.47 |
| 3rd | O | | O | | | 1.82 | 1.59 |
| 4th | O | O | | | | 1.14 | 1.25 |
| 5th | | O | O | | | 0.91 | 1.11 |
| 6th | | O | | | O | 0.82 | 1.39 |
| 7th | | O | | O | | 0.59 | |
| Rev | | | O | O | | 2.35 | GEAR RATIO WIDTH (γ1/γ7) 6.38 |

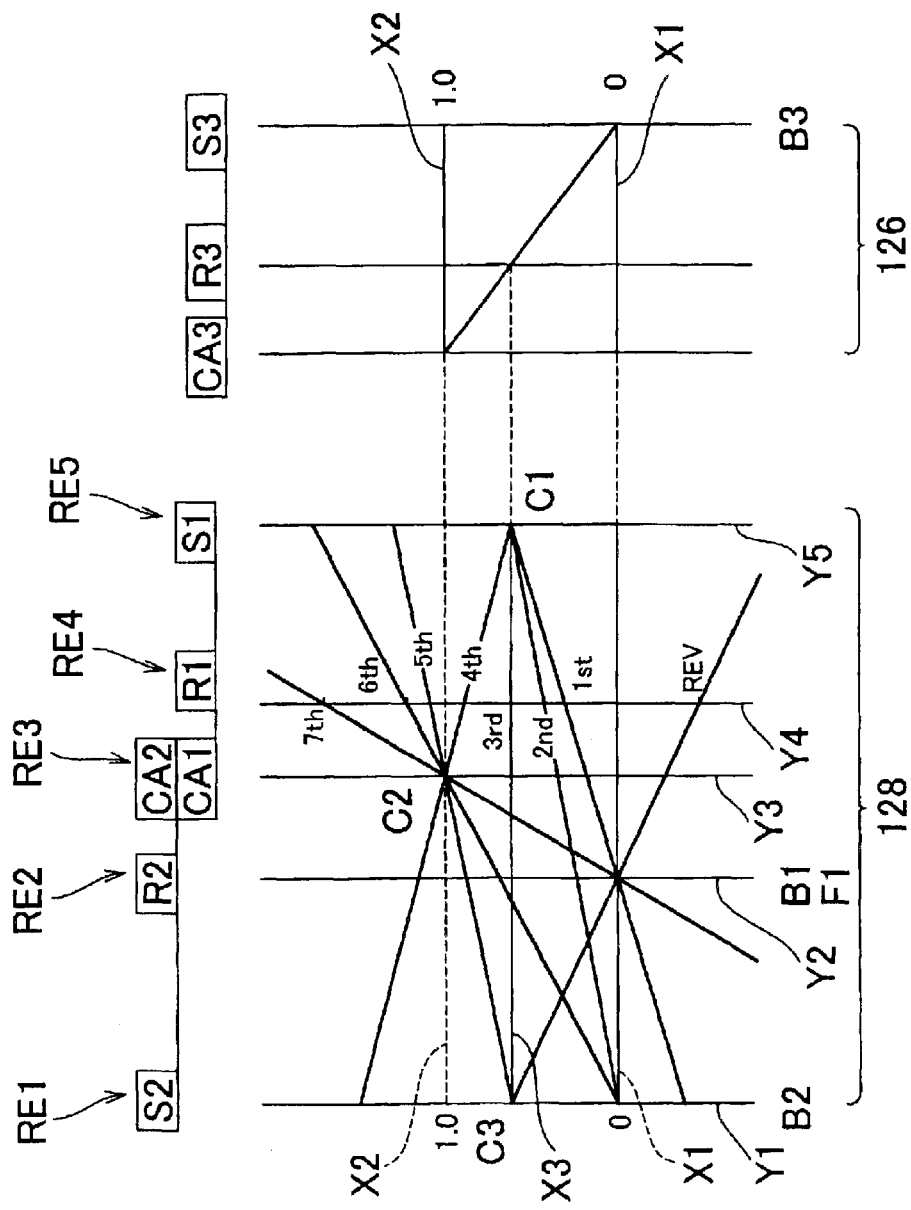

AUTOMATIC TRANSMISSION OF MOTOR VEHICLE

INCORPORATION BY REFERENCE

The disclosures of Japanese Patent Applications No. 2002-144616 filed on May 20, 2002, No. 2002-153088 filed on May 27, 2002, and No. 2002-162118 filed on Jun. 3, 2002, each including the specification, drawings and abstract, are incorporated herein by reference in their entireties.

BACKGROUND OF THE INVENTION

1. Field of the Invention

The invention generally relates to automatic transmissions of motor vehicles, and in particular to an automatic transmission which includes a plurality of planetary gear sets and provides seven or more forward gear stages, and which has a relatively small size and operates with a reduced loss.

2. Description of Related Art

Automatic transmissions of motor vehicles each having a plurality of planetary gear sets, clutches and brakes have been widely used. One example of such automatic transmissions as disclosed in Japanese Laid-open Patent Publication No. 2000-266138 is able to provide seven forward gear stages by using four planetary gear sets.

However, the use of the four planetary gear sets in the known automatic transmission causes an increase in the axial length of the transmission and an increased difficulty in installing the transmission on the vehicle, and also results in increases in the weight and cost of the transmission. Furthermore, the known automatic transmission includes seven friction devices which are selectively engaged and released for establishing seven gear stages. Thus, the known transmission requires an increased number of components, which results in an increased cost, and suffers from relatively large drag resistance, which causes deterioration in the fuel economy.

SUMMARY OF THE INVENTION

It is therefore an object of the invention to provide an automatic transmission of a motor vehicle which is able to provide seven or more forward gear stages or speeds by using three or four planetary gear sets and a reduced number of friction devices.

To accomplish the above object, there is provided according to a first aspect of the invention an automatic transmission, which comprises (a) an input member, (b) an output member, (c) an auxiliary power transmitting portion including a planetary gear set having three rotating elements, wherein when one of the three rotating elements is coupled to and rotated with the input member and another one of the rotating elements is fixed to be inhibited from rotating, the remaining rotating element serving as an intermediate rotating element is rotated at a reduced speed as compared with that of the input member, the auxiliary power transmitting portion further including an intermediate rotation output friction device that is operable, when engaged, to permit the intermediate rotating element to output rotary power at the reduced speed, and (d) a main power transmitting portion including a plurality of planetary gear sets including sun gears, carriers and ring gears, parts of which are coupled to each other to provide a first rotating element, a second rotating element, a third rotating element, a fourth rotating element and a fifth rotating element, which are arranged in the order of description from one end to the other end in a nomogram in which speeds of rotation of the first, second, third, fourth and fifth rotating elements are represented by straight lines, the main power transmitting portion further including a first brake, a second brake, a first clutch and a second clutch, wherein the first rotating element is coupled to the intermediate rotating member and is selectively inhibited from rotating by the second brake, the second rotating element is selectively inhibited from rotating by the first brake, the third rotating element is selectively coupled to the input member via the second clutch, the fifth rotating element is selectively coupled to the input member via the first clutch, and the fourth rotating element is coupled to the output member so as to output rotary power from the main power transmitting portion. In this automatic transmission, a first-speed gear stage having the largest gear ratio is established when the first clutch and the first brake are engaged, a second-speed gear stage having a smaller gear ratio than that of the first-speed gear stage is established when the first clutch and the second brake are engaged, a third-speed gear stage having a smaller gear ratio than that of the second-speed gear stage is established when the first clutch and the intermediate rotation output friction device are engaged, a fourth-speed gear stage having a smaller gear ratio than that of the third-speed gear stage is established when the first clutch and the second clutch are engaged, a fifth-speed gear stage having a smaller gear ratio than that of the fourth-speed gear stage is established when the second clutch and the intermediate rotation output friction device are engaged, a sixth-speed gear stage having a smaller gear ratio than that of the fifth-speed gear stage is established when the second clutch and the second brake are engaged, and a seventh-speed gear stage having a smaller gear ratio than that of the sixth-speed gear stage is established when the second clutch and the first brake are engaged.

The automatic transmission constructed as described above is able to establish seven forward gear stages by using three planetary gear sets and a total of five friction devices. Thus, the weight and size of the transmission can be reduced as compared with the case where four planetary gear sets are used. At the same time, the number of friction devices required for shifting the transmission is reduced, resulting in a reduced number of components and reduced cost. Furthermore, the drag resistance is reduced, and the fuel economy can be further improved.

According to a second aspect of the invention, there is provided an automatic transmission, which comprises (a) an input member, (b) an output member, (c) an auxiliary power transmitting portion including a planetary gear set having three rotating elements, wherein when one of the three rotating elements is coupled to and rotated with the input member, and another one of the rotating elements is fixed to be inhibited from rotating, the remaining rotating element serving as an intermediate rotating element is rotated at a reduced speed as compared with that of the input member, the auxiliary power transmitting portion further including an intermediate rotation output friction device that is operable, when engaged, to permit the intermediate rotating element to output rotary power at the reduced speed, and (d) a main power transmitting portion including a plurality of planetary gear sets including sun gears, carriers and ring gears, parts of which are coupled to each other to provide a first rotating element, a second rotating element, a third rotating element, a fourth rotating element and a fifth rotating element, which are arranged in the order of description from one end to the other end in a nomogram in which speeds of rotation of the first, second, third, fourth and fifth rotating elements are represented by straight lines, the main power transmitting portion further including a first brake, a second brake, a first clutch and a second clutch, wherein the first rotating element is selectively coupled to the input member via the second clutch and is selectively inhibited from rotating by the second brake, the second rotating element is selectively inhibited from rotating by the first brake, the third rotating element is selectively coupled to the input member via the first clutch, the fifth rotating element is coupled to or selectively coupled to the intermediate output member, and the fourth rotating element is coupled to the output member so as to output rotary power from the main power transmitting portion. In this automatic transmission, a first-speed gear stage having the largest gear ratio is established when the intermediate rotation output friction device and the first brake are engaged, a second-speed gear stage having a smaller gear ratio than that of the first-speed gear stage is established when the intermediate rotation output friction device and the second brake are engaged, a third-speed gear stage having a smaller gear ratio than that of the second-speed gear stage is established when the second clutch and the intermediate rotation output friction device are engaged, a fourth-speed gear stage having a smaller gear ratio than that of the third-speed gear stage is established when the first clutch and the intermediate rotation output friction device are engaged, a fifth-speed gear stage having a smaller gear ratio than that of the fourth-speed gear stage is established when the first clutch and the second clutch are engaged, a sixth-speed gear stage having a smaller gear ratio than that of the fifth-speed gear stage is established when the first clutch and the second brake are engaged, and a seventh-speed gear stage having a smaller gear ratio than that of the sixth-speed gear stage is established when the first clutch and the first brake are engaged.

The automatic transmission constructed as described above is able to establish seven forward gear stages by using three or four planetary gear sets and a total of five friction devices. Thus, the weight and size of the transmission can be reduced as compared with the case where four planetary gear sets and a total of seven friction devices are used. At the same time, the number of friction devices required for shifting the transmission is reduced, resulting in a reduced number of components and reduced cost. Furthermore, the drag resistance is reduced, and the fuel economy can be further improved.

According to a third aspect of the invention, there is provided an automatic transmission, which comprises (a) an input member, (b) an output member, (c) an auxiliary power transmitting portion including a planetary gear set having three rotating elements, wherein when one of the rotating elements is coupled to and rotated with the input member, and another one of the rotating element is fixed to be inhibited from rotating, the remaining rotating element serving as an intermediate rotating element is rotated at a reduced speed as compared with that of the input member, the auxiliary power transmitting portion further including an intermediate rotation output friction device that is operable, when engaged, to permit the intermediate rotating element to output rotary power at the reduced speed, and (d) a main power transmitting portion including a plurality of planetary gear sets including sun gears, carriers and ring gears, parts of which are coupled to each other to provide a first rotating element, a second rotating element, a third rotating element, a fourth rotating element and a fifth rotating element, which are arranged in the order of description from one end to the other end in a nomogram in which speeds of rotation of the first, second, third, fourth and fifth rotating elements are represented by straight lines, the main power transmitting portion further including a first brake, a second brake, a first clutch, a second clutch and a third clutch, wherein the first rotating element is selectively inhibited from rotating by the second brake and is selectively coupled to the intermediate rotating member via the third clutch, the second rotating element is selectively inhibited from rotating by the first brake, the third rotating element is selectively coupled to the input member via the second clutch, the fifth rotating element is selectively coupled to the intermediate rotating member via the first clutch, and the fourth rotating element is coupled to the output member so as to output rotary power from the main power transmitting portion. In this automatic transmission, a first-speed gear stage having the largest gear ratio is established when the first clutch and the first brake are engaged, a second-speed gear stage having a smaller gear ratio than that of the first-speed gear stage is established when the first clutch and the second brake are engaged, a third-speed gear stage having a smaller gear ratio than that of the second-speed gear stage is established when the first clutch and the third clutch are engaged, a fourth-speed gear stage having a smaller gear ratio than that of the third-speed gear stage is established when the first clutch and the second clutch are engaged, a fifth-speed gear stage having a smaller gear ratio than that of the fourth-speed gear stage is established when the second clutch and the third clutch are engaged, a sixth-speed gear stage having a smaller gear ratio than that of the fifth-speed gear stage is established when the second clutch and the second brake are engaged, and a seventh-speed gear stage having a smaller gear ratio than that of the sixth-speed gear stage is established when the second clutch and the first brake are engaged.

The automatic transmission constructed as described above is able to establish seven or more forward gear stages by using three planetary gear sets and a total of five friction devices, i.e., three clutches and two brakes. Thus, the weight and size of the transmission can be reduced as compared with the case where four planetary gear sets are used. At the same time, the number of friction devices required for shifting the transmission is reduced, resulting in a reduced number of components and reduced cost. Furthermore, the drag resistance is reduced, and the fuel economy can be further improved.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 2 is an operation table indicating a plurality of gear stages of the automatic transmission of FIG. 1, and selected ones of a plurality of friction devices for establishing each of the gear stages;

FIG. 6 is an operation table indicating a plurality of gear stages of the automatic transmission of FIG. 5, and selected ones of a plurality of friction devices for establishing each of the gear stages;

FIG. 16 is an operation table indicating a plurality of gear stages of the automatic transmission of FIG. 15, and selected ones of a plurality of friction devices for establishing each of the gear stages; and FIG. 17 is a nomogram plotted with respect to the automatic transmission of FIG. 15.

DETAILED DESCRIPTION OF EXEMPLARY EMBODIMENTS

Some exemplary embodiments of the invention will be described in detail with reference to the drawings.

Figure 1:
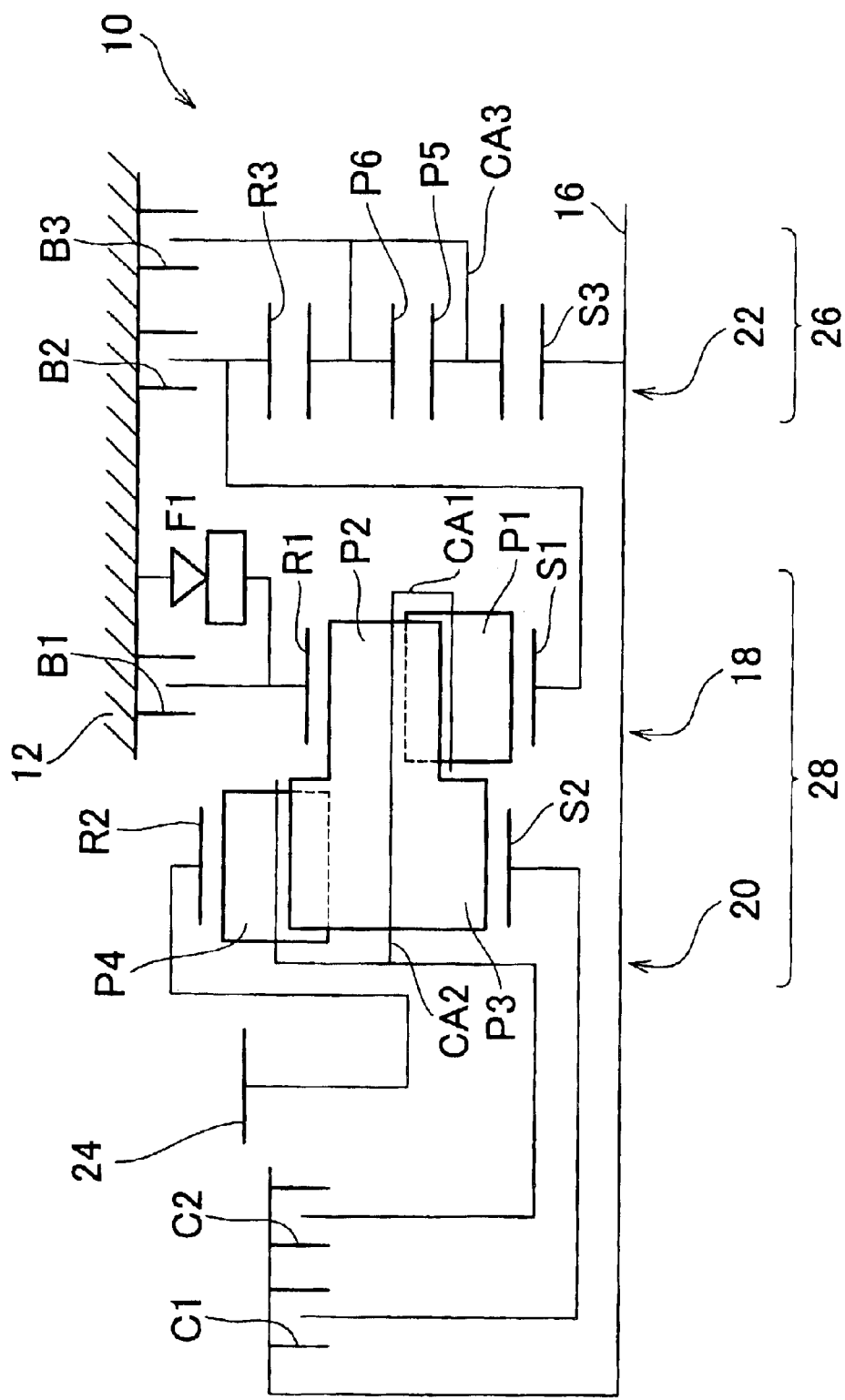
FIG. 1 is a schematic view showing an automatic transmission of a motor vehicle according to a first embodiment of the invention.
Figure 3:
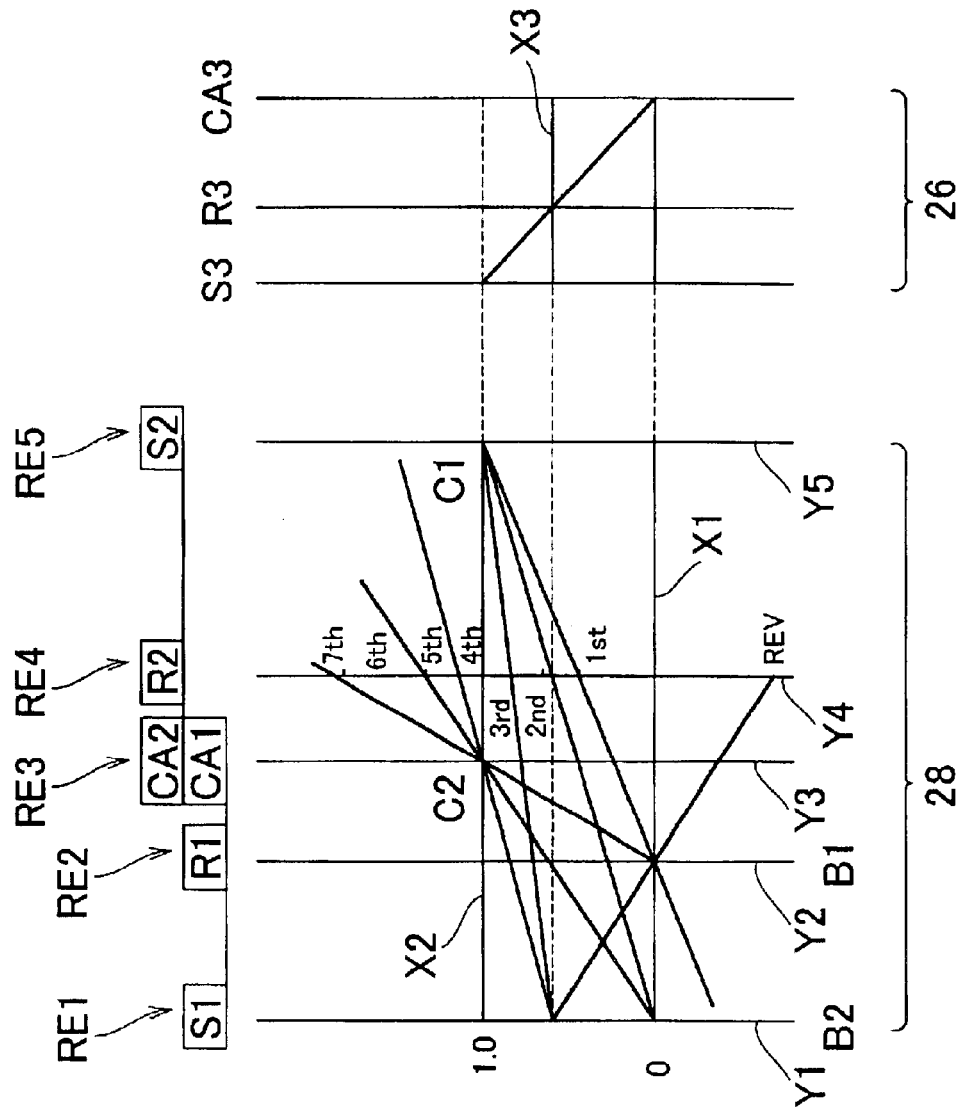
FIG. 3 is a nomogram plotted with respect to the automatic transmission of FIG. 1.

FIG. 1 schematically shows a planetary gear type automatic transmission (hereinafter simply referred to as "transmission") 10 of a motor vehicle according to a first embodiment of the invention. FIG. 2 is an operation table indicating engaging elements and the gear ratio (or speed ratio) with respect to each of a plurality of gear stages or speeds to be established by the transmission. FIG. 3 is a nomogram plotted with respect to the transmission of FIG. 1.

Referring first to FIG. 1, the transmission 10 receives rotary power transmitted from an engine (not shown) to an input shaft 16 thereof, changes the speed of rotation at a given gear ratio, and transmits the power from an output gear 24 to right and left driving wheels, via a propeller shaft (not shown), a differential gear unit (not shown), and other members. The transmission 10 includes a torque converter (not shown) provided with a lockup clutch, the input shaft 16 coupled to the torque converter, a third planetary gear set 22, a first planetary gear set 18, and a second planetary gear set 20, which are arranged on the common axis of rotation within a transmission case (non-rotating member) 12 attached to the vehicle body. The transmission 10 further includes the output gear 24 that is disposed at one side of the second planetary gear set 20 remote from the input shaft 16, to be located between the second planetary gear set 20 and a second clutch C2. The above-indicated torque converter is coupled to a crankshaft (not shown) of the engine. In this embodiment, the input shaft 16 and the output gear 24 correspond to an input rotating member and an output rotating member, respectively, and the transmission case 12 corresponds to a non-rotating or stationary member. It is to be noted that the transmission 10 is constructed symmetrically with respect to the rotational axis thereof, and that the lower half of the transmission 10 is not shown in FIG. 1 (i.e., only the upper half of the transmission 10 is illustrated in FIG. 1).

The automatic transmission 10 is transversely or laterally installed on, for example, a front engine front drive (FF) vehicle, such that the axis of the transmission 10 extends in the width direction of the vehicle. The transmission 10 includes an auxiliary power transmitting portion 26 that mainly consists of the third planetary gear set 22 of a double pinion type, and a main power transmitting portion 28 that mainly consists of the first planetary gear set 18 of a double pinion type and the second planetary gear set 20 of a double pinion type. The transmission 10 is adapted to establish a selected one of seven forward gear stages having seven different gear ratios $\gamma_n$ and one reverse gear stage, by engaging selected ones of five friction devices. With the selected gear stage thus established, the transmission 10 changes the speed of rotation of the input shaft 16 at a gear ratio corresponding to the gear stage, and transmits the resulting rotary power to the output gear 24.

In the auxiliary power transmitting portion 26, the third planetary gear set 22 includes a third sun gear S3, a third ring gear R3, a fifth pinion P5, a sixth pinion P6, and a third carrier CA3. The third ring gear R3 is disposed coaxially with and radially outwardly of the third sun gear S3, and the fifth pinion P5 meshes with the third sun gear S3, while the sixth pinion P6 meshes with the third ring gear R3. The third carrier CA3 supports the fifth pinion P5 and the sixth pinion P6 that mesh with each other, such that the fifth and sixth pinions P5, P6 are able to rotate about themselves and rotate about the axis of the third planetary gear set 22 (i.e., input shaft 16). The third sun gear S3 is coupled to the input shaft 16, such that the sun gear S3 and the input shaft 16 are rotated or driven together. The third carrier CA3 is selectively coupled to the transmission case 12 as the non-rotating member, via a third brake B3. The above-indicated third ring gear R3 is selectively coupled to the transmission case 12 as the non-rotating member, via a second brake B2, and is coupled to the first sun gear S1 of the first planetary gear set 18. The ring gear R3 functions as an intermediate rotating member that outputs driving power to the main power transmitting portion 28 at an intermediate rotational speed to which the speed of rotation of the input shaft 16 is reduced by the third planetary gear set 22. The third brake B3 serves as an intermediate rotation output friction device which operates, when engaged, to output rotary power from the third ring gear R3 at the intermediate rotational speed.

In the main power transmitting portion 28, the first planetary gear set 18 includes the first sun gear S1, a first ring gear R1, a first pinion P1, a second pinion P2 and a first carrier CA1. The first sun gear S1 is selectively coupled to the transmission case 12 via the second brake B2, and is also coupled to the third ring gear R3 of the third planetary gear set 22. The first ring gear R1 is selectively coupled to the transmission case 12 via a first brake B1. The first pinion P1 meshes with the first sun gear S1 and the second pinion P2 meshes with the first ring gear R1. The first carrier CA1 supports the first pinion P1 and the second pinion P2 that mesh with each other, such that the first and second pinions P1, P2 are able to rotate about themselves and rotate about the axis of the first planetary gear set 18. The second planetary gear set 20 includes a second sun gear S2, a second ring gear R2, a third pinion P3, a fourth pinion P4, and a second carrier CA2. The second sun gear S2 is selectively coupled to the input shaft 16 via a first clutch C1, and the second ring gear R2 is coupled to the output gear 24. The third pinion P3 meshes with the second sun gear S2, and has a larger diameter than the second pinion P2. The third pinion P3 is coaxially coupled to the second pinion P2 such that the third and second pinions P3, P2 rotate as a unit. The fourth pinion P4 meshes with the second ring gear R2 and the third pinion P3. The second carrier CA2 supports the third pinion P3 and the fourth pinion P4 such that the third and fourth pinions P3, P4 are able to rotate about themselves and rotate about the axis of the second planetary gear set 20. Furthermore, the second carrier CA2 is coupled to the first carrier CA1 such that the first and second carriers CA1, CA2 rotate as a unit, and is also selectively coupled to the input shaft 16 via the second clutch C2. A one-way clutch F1 is disposed in parallel with the first brake B1, between the first ring gear R1 and the transmission case 12. The first brake B1 and the one-way clutch F1 may be replaced by only one of the first brake B1 and the one-way clutch F1.

Each of the first clutch C1, second clutch C2, first brake B1, second brake B2 and the third brake B3 is a hydraulically operated friction device, which may be generally used in conventional planetary gear type automatic transmissions. The friction device serves to selectively couple two members between which the device is interposed, to each other. For example, the friction device may be of a wet multiple disc type in which a plurality of friction plates that are superposed on each other are pressed by a hydraulic actuator, or may be in the form of a band brake in which one end of one or two band(s) wound around the outer circumferential surface of a rotating drum is strained or drawn in by a hydraulic actuator. The one-way clutch F1 disposed in parallel with the first brake B1 also functions as an engaging device equivalent to the first brake, and only one of the one-way clutch F1 and the first brake B1 may be provided.

In the transmission 10 constructed as described above, a selected one of the forward $1^{st}$-speed gear stage through $7^{th}$-speed gear stage and reverse gear stage is established by engaging two friction devices selected from the first clutch C1, second clutch C2, first brake B1, second brake B2 and the third brake B3 at the same time, as indicated in the operation table of FIG. 2. As described later, the gear ratios γ (=input shaft rotational speed Nin/output shaft rotational speed Nout) of the forward gear stages differ successively at substantially equal ratios (namely, the ratio of the gear ratio γ of one of the forward gear stages to that of the next gear stage is substantially constant.)

More specifically described referring to FIG. 2, the $1^{st}$-speed gear stage having the largest gear ratio $γ_1$, which is, for example, equal to 2.52, is established by engaging the first clutch C1 and the first brake B1 so that the input shaft 16 and the second sun gear S2 are coupled to each other and the first ring gear R1 and the transmission case 12 are coupled to each other. The $2^{nd}$-speed gear stage having a gear ratio $γ_2$, which is smaller than the gear ratio $γ_1$ and is, for example, equal to 1.88, is established by engaging the first clutch C1 and the second brake B2 so that the input shaft 16 and the second sun gear S2 are coupled to each other and the first sun gear S1, third ring gear R3 and the transmission case 12 are coupled to each other. The $3^{rd}$-speed gear stage having a gear ratio $γ_3$, which is smaller than the gear ratio $γ_2$ and is, for example, equal to 1.35, is established by engaging the first clutch C1 and the third brake B3 so that the input shaft 16 and the second sun gear S2 are coupled to each other, and the third carrier CA3 and the transmission case 12 are coupled to each other. The $4^{th}$-speed gear stage having a gear ratio $γ_4$, which is smaller than the gear ratio $γ_3$ and is, for example, equal to 1.00, is established by engaging the first clutch C1 and the second clutch C2 so that the input shaft 16 and the second sun gear S2 are coupled to each other, and the input shaft 16, the second carrier CA2 and the first carrier CA1 are coupled to each other. The $5^{th}$-speed gear stage having a gear ratio $γ_5$, which is smaller than the gear ratio $γ_4$ and is, for example, equal to 0.83, is established by engaging the second clutch C2 and the third brake B3 so that the input shaft 16, the second carrier CA2 and the first carrier CA1 are coupled to each other, and the third carrier CA3 and the transmission case 12 are coupled to each other. The $6^{th}$-speed gear stage having a gear ratio $γ_6$, which is smaller than the gear ratio $γ_5$ and is, for example, equal to 0.74, is established by engaging the second clutch C2 and the second brake B2 so that the input shaft 16, the second carrier CA2 and the first carrier CA1 are coupled to each other, and the first sun gear S1, the third ring gear R3 and the transmission case 12 are coupled to each other. The $7^{th}$-speed gear stage having a gear ratio $γ_7$, which is smaller than the gear ratio $γ_6$ and is, for example, equal to 0.55, is established by engaging the second clutch C2 and the first brake B1 so that the input shaft 16, the second carrier CA2 and the first carrier CA1 are coupled to each other, and the first ring gear R1 and the transmission case 12 are coupled to each other. The reverse gear stage having a gear ratio $γ_R$, which is between the gear ratio $γ_2$ and the gear ratio $γ_3$ and is, for example, equal to 1.65, is established by engaging the first brake B1 and the third brake B3 so that the first ring gear R1 and the transmission case 12 are coupled to each other, and the third carrier CA3 and the transmission case 12 are coupled to each other. The gear ratio (=the number of teeth of the sun gear/the number of teeth of the ring gear) $ρ_1$ of the first planetary gear set 18, the gear ratio $ρ_2$ of the second planetary gear set 20, and the gear ratio $ρ_3$ of the third planetary gear set 22 are determined so as to provide the gear ratios $γ_1$–$γ_7$ and $γ_R$ as indicated above. For example, $ρ_1$ is equal to 0.43, $ρ_2$ is equal to 0.23, and $ρ_3$ is equal to 0.44.

In the transmission 10 as described above, the rate of change of the gear ratio (i.e., ratio of the gear ratios of the adjacent gear stages=$γ_n/γ_{n+1}$) may be determined as follows: the ratio (=$γ_1/γ_2$) of the gear ratio $γ_1$ of the $1^{st}$-speed gear stage to the gear ratio $γ_2$ of the $2^{nd}$-speed gear stage is 1.34, the ratio (=$γ_2/γ_3$) of the gear ratio $γ_2$ of the $2^{nd}$-speed gear stage to the gear ratio $γ_3$ of the $3^{rd}$-speed gear stage is 1.39, the ratio (=$γ_3/γ_4$) of the gear ratio $γ_3$ of the $3^{rd}$-speed gear stage to the gear ratio $γ_4$ of the $4^{th}$-speed gear stage is 1.35, the ratio (=$γ_4/γ_5$) of the gear ratio $γ_4$ of the $4^{th}$-speed gear stage to the gear ratio $γ_5$ of the $5^{th}$-speed gear stage is 1.20, the ratio (=$γ_5/γ_6$) of the gear ratio $γ_5$ of the $5^{th}$-speed gear stage to the gear ratio $γ_6$ of the $6^{th}$-speed gear stage is 1.12, and the ratio (=$γ_6/γ_7$) of the gear ratio $γ_6$ of the $6^{th}$-speed gear stage to the gear ratio $γ_7$ of the $7^{th}$-speed gear stage is 1.35. Thus, the gear ratios γ change at substantially equal ratios or rates. Also, in the transmission 10, the total width of the gear ratios ($γ_1/γ_7$), namely, the ratio of the gear ratio $γ_1$ of the $1^{st}$-speed gear stage to the gear ratio $γ_7$ of the $7^{th}$-speed gear stage, is a sufficiently large value, which is, for example, 4.61. Also, the gear ratio of the reverse gear stage "Rev" is an appropriate value. Thus, the transmission 10 provides appropriate gear-ratio (speed-change) characteristics over the entire range of operation.

FIG. 3 is a nomogram in which straight lines represent the relationships of the speeds of rotation of rotating elements (as described later) which are in different coupling states for respective gear stages. The nomogram of FIG. 3 is a two-dimensional coordinate system in which the horizontal axis indicates the relationship among the gear ratios ρ of the respective planetary gear sets 18, 20, 22, and the vertical axis indicates relative rotational speeds. In the nomogram of FIG. 3 showing three horizontal lines, the lower horizontal line X1 indicates rotational speed "0", the middle horizontal line X3 indicates a rotational speed that is lower than the speed of rotation of the input shaft 16, and the upper horizontal line X2 indicates rotational speed "1.0", which is equal to the speed of rotation of the input shaft 16. Five vertical lines Y1 through Y5 in the section of the main power transmitting portion 28 respectively represent the first sun gear S1 corresponding to a first rotating element RE1, the first ring gear R1 corresponding to a second rotating element RE2, the first carrier CA1 and the second carrier CA2 that are coupled to each other and correspond to a third rotating element RE3, the second ring gear R2 corresponding to a fourth rotating element RE4, and the second sun gear S2 corresponding to a fifth rotating element RE5. The intervals of these vertical lines are determined in accordance with the gear ratio $\rho_1$ of the first planetary gear set 18 and the gear ratio $\rho_2$ of the second planetary gear set 20. More specifically, the interval between the vertical lines corresponding to the sun gear and the carrier is set as "1", and the interval between the vertical lines corresponding to the carrier and the ring gear is set as "ρ". In FIG. 3, the interval between the vertical line Y5 corresponding to the second sun gear S2 of the second planetary gear set 20 and the vertical line Y4 corresponding to the second ring gear R2 is set as "1".

The main power transmitting portion 28 will be described by utilizing the nomogram of FIG. 3. Parts of the first sun gear S1, first carrier CA1 and the first ring gear R1 of the first planetary gear set 18 and the second sun gear S2, second carrier CA2 and the second ring gear R2 of the second planetary gear set 20 are coupled to each other so as to provide five rotating elements RE1 through RE5. In the monogram of FIG. 3, the speeds of rotation of the five rotating elements RE1 through RE5 are represented by straight lines, and the first rotating element RE1, second rotating element RE2, third rotating element RE3, fourth rotating element RE4 and the fifth rotating element RE5 are arranged in this order from one end (i.e., left end in FIG. 3) to the other end (i.e., right end in FIG. 3). In the transmission 10 of this embodiment, the first rotating element RE1 (S1) is coupled to the third ring gear R3 serving as an intermediate rotating member so as to be rotated at an intermediate rotational speed, and is also selectively inhibited from rotating by the second brake B2. The second rotating element RE2 (R1) is selectively inhibited from rotating by the first brake B1, and the third rotating element RE3 (CA1, CA2) is selectively coupled to the input shaft 16 (input member) via the second clutch C2. The fifth rotating element RE5 (S2) is selectively coupled to the input shaft 16 via the first clutch C1, and the fourth rotating element RE4 (R2) is coupled to the output gear 24 (output member).

As is apparent from the nomogram of FIG. 3, when the first clutch C1 and the first brake B1 are engaged, and the fifth rotating element RE5 (S2) is rotated as a unit with the input shaft 16 while the second rotating element RE2 (R1) is inhibited from rotating, the fourth rotating element RE4 (R2) is rotated at a speed denoted by "$1^{st}$" in FIG. 3, so that the $1^{st}$-speed gear stage having the largest gear ratio is established. When the first clutch C1 and the second brake B2 are engaged, and the fifth rotating element RE5 (S2) is rotated as a unit with the input shaft 16 while the first rotating element RE1 (S1) is inhibited from rotating, the fourth rotating element RE4 (R2) is rotated at a speed denoted by "$2^{nd}$" in FIG. 3, so that the $2^{nd}$-speed gear stage having a smaller gear ratio than that of the $1^{st}$-speed gear stage is established. When the first clutch C1 and the third brake B3 are engaged, and the fifth rotating element RE5 (S2) is rotated as a unit with the input shaft 16 while the first rotating element RE1 (S1) is rotated with the third ring gear R3 at the intermediate rotational speed, the fourth rotating element RE4 (R2) is rotated at a speed denoted by "$3^{rd}$" in FIG. 3, so that the $3^{rd}$-speed gear stage having a smaller gear ratio than that of the $2^{nd}$-speed gear stage is established. When the first clutch C1 and the second clutch C2 are engaged, and the third rotating element RE3 (CA1, CA2) and the fifth rotating element RE5 (S2) are rotated at the same speed as the input shaft 16, the fourth rotating element RE4 (R2) is rotated at a speed denoted by "$4^{th}$" in FIG. 3, namely, at the same speed as the input shaft 16, so that the $4^{th}$-speed gear stage having a smaller gear ratio than that of the $3^{rd}$-speed gear stage is established. The gear ratio of the $4^{th}$-speed gear stage is equal to 1. When the second clutch C2 and the third brake B3 are engaged, and the third rotating element RE3 (CA1, CA2) are rotated as a unit with the input shaft 16 while the first rotating element RE1 (S1) is rotated along with the third ring gear R3 at the intermediate rotational speed, the fourth rotating element RE4 (R2) is rotated at a speed denoted by "$5^{th}$" in FIG. 3, so that the $5^{th}$-speed gear stage having a smaller gear ratio than that of the $4^{th}$-speed gear stage is established. When the second clutch C2 and the second brake B2 are engaged, and the third rotating element RE3 (CA1, CA2) is rotated along with the input shaft 16 while the first rotating element RE1 (S1) is inhibited from rotating, the fourth rotating element RE4 (R2) is rotated at a speed denoted by "$6^{th}$" in FIG. 3, so that the $6^{th}$-speed gear stage having a smaller gear ratio than that of the $5^{th}$-speed gear stage is established. When the second clutch C2 and the first brake B1 are engaged, and the third rotating element RE3 (CA1, CA2) is rotated along with the input shaft 16 while the second rotating element RE2 (R1) is inhibited from rotating, the fourth rotating element RE4 (R2) is rotated at a speed denoted by "$7^{th}$" in FIG. 3, so that the $7^{th}$-speed gear stage having a smaller gear ratio than that of the $6^{th}$-speed gear stage is established.

When the first brake B1 and the third brake B3 are engaged, and the first rotating element RE1 (S1) is rotated along with the third ring gear R3 at the intermediate rotational speed while the second rotating element RE2 (R1) is inhibited from rotating, the fourth rotating element RE4 (R2) is rotated in the reverse direction at a speed denoted by "REV" in FIG. 3, so that the reverse gear stage "Rev" is established.

As described above, the automatic transmission 10 of the present embodiment is able to establish seven forward gear stages by using three gear sets, i.e., the first planetary gear set 18, second planetary gear set 20, and the third planetary gear set 22, and a total of five friction devices, i.e., two clutches C1 and C2 and three brakes B1, B2 and B3. Thus, the weight and size of the transmission 10 can be reduced as compared with the case where four planetary gear sets are used, thus making it easier to install the transmission 10 on the vehicle. At the same time, the number of friction devices required for shifting the transmission 10 is reduced, resulting in a reduced number of components and reduced cost. Furthermore, the drag resistance is reduced, and the fuel economy can be further improved.

In the first embodiment as described above, the second pinion P2 of the double-pinion type first planetary gear set 18 and the third pinion P3 of the double-pinion type second planetary gear set 20 are coupled to each other on the same axis so that these pinions P2, P3 are rotated as a unit. Like Ravigneaux type planetary gear trains, this arrangement requires a further reduced number of components and further reduced axial length, which result in further reduction in the size and cost of the transmission 10.

In the first embodiment as described above, the main power transmitting portion 28 includes the first planetary gear set 18 and the second planetary gear set 20, and the first rotating element RE1 is the first sun gear S1, the second rotating element RE2 is the first ring gear R1, the third rotating element RE3 consists of the first carrier CA1 and the second carrier CA2, the fourth rotating element RE4 is the second ring gear R2, and the fifth rotating element RE5 is the second sun gear S2. With this arrangement, the automatic transmission 10 having seven forward gear stages can be made compact.

Figure 4:
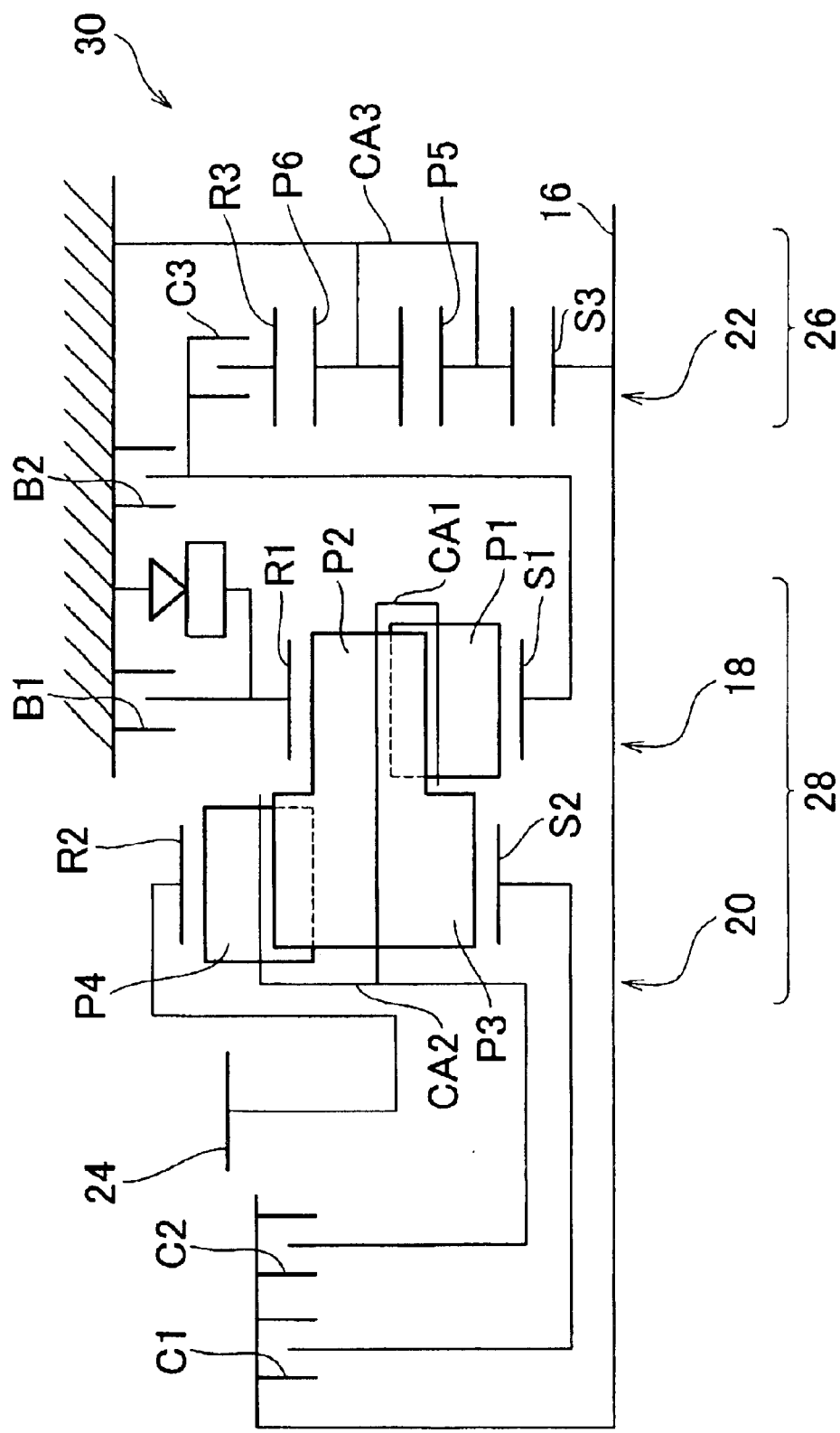
FIG. 4 is a schematic view showing an automatic transmission of a motor vehicle according to a second embodiment of the invention, as a modified example of the automatic transmission of FIG. 1.

Next, a second embodiment of the invention will be described with reference to FIG. 4. In the following description, the same reference numerals as used in the first embodiment are used for identifying corresponding elements or portions, of which no detailed description is provided. FIG. 4 schematically shows the construction of an automatic transmission 30 that provides seven forward gear stages by using five friction devices, like the transmission 10 of the first embodiment.

The transmission 30 is different from the transmission 10 in that the third carrier CA3 of the auxiliary power transmitting portion 26 is directly coupled to the transmission case 12 such that the carrier CA3 is always inhibited from rotating, and that a third clutch C3 is provided between the third ring gear R3 and the first sun gear S1, such that the third ring gear R3 and the first sun gear S1 are selectively coupled to each other. The transmission 30 is similar to the transmission 10 in the other aspects. In the second embodiment, the third sun gear S3 as one of three rotating elements of the third planetary gear set 22 is rotated along with the input shaft 16, and rotation of the third ring gear R3 corresponding to an intermediate rotating member that is rotated at a lower speed than the input shaft 16 is transmitted to the main power transmitting portion 28 via the third clutch C3. The third clutch C3 of this embodiment functions as an intermediate rotation output friction device in a similar manner to the third brake B3 of the transmission 10. Thus, the transmission 30 is able to establish seven forward gear stages based on an operation table similar to that of FIG. 2 and a nomogram similar to that of FIG. 3, in which the third brake B3 is replaced by the third clutch C3. The rotating elements RE1, RE2, RE3, RE4 and RE5 of this embodiment are identical with those of the first embodiment. With this arrangement, the transmission 30 of the second embodiment yields similar advantageous effects to those provided by the transmission 10 of the first embodiment.

While the first and second embodiments of the invention have been described in detail with reference to FIG. 1 through FIG. 4, the invention may be otherwise embodied.

While the third planetary gear set 22 that constitutes the auxiliary power transmitting portion 26 is of a double pinion type in the illustrated embodiments, the third planetary gear set 22 may be of a single pinion type. Also, any one of the third sun gear S3, third carrier CA3 and the third ring gear R3 corresponding to three rotating elements of the third planetary gear set 22 may be fixed, or may serve as an intermediate rotating member, or may be directly or indirectly coupled to the input member. In sum, the auxiliary power transmitting portion 26 is constructed such that when one of the three rotating elements of the planetary gear set that is coupled to the input member is rotated with the input member, and another one of the rotating elements is fixed to be inhibited from rotating, while the remaining one of the rotating elements serving as an intermediate rotating member is rotated at a reduced speed as compared with that of the input member. When the intermediate rotation output friction device is engaged, the reduced-speed rotation of the intermediate rotating member is selectively transmitted to the main power transmitting portion 28.

While the automatic transmissions 10, 30 of the illustrated embodiments are suitably installed in the lateral direction on front engine front drive (FF) vehicles in which the axis of the transmission 10, 30 extends in the width direction of the vehicle, the automatic transmissions 10, 30 may be installed in the vertical direction on front engine rear drive (FR) vehicles in which the axis of the transmission 10, 30 extends in the longitudinal or running direction of the vehicle.

While the automatic transmission 10, 30 may automatically change its gear ratio or gear stage depending upon vehicle operating conditions, such as an accelerator pedal position and a vehicle speed, the transmission 10, 30 may change its gear ratio in response to switching operations (e.g., upshifting and downshifting operations) performed by the vehicle operator or driver.

In the automatic transmission 10, 30 as described above, hydraulically operated friction devices of multiple-disc type, single-disc type or belt type, which are frictionally engaged by use of hydraulic actuators, are suitably used as the first clutch C1, second clutch C2, third clutch C3, first brake B1, second brake B2 and the third brake B3. However, other types of engaging devices, such as those of electromagnetic type, may also be used as the clutches and brakes. To make shift control easy, one-way clutches may be provided in parallel with the brakes or clutches. If an engine brake need not be applied, one-way clutches may be used in place of the brakes or clutches. Here, one-way clutches function, like brakes, to stop rotation of corresponding rotating members. Other than the above arrangements, the automatic transmission 10, 30 may be constructed in various ways. For example, a brake and a one-way clutch, which are connected in series, may be provided in parallel with the first brake B1.

In the automatic transmission 10, 30, for example, the positional relationship between the main power transmitting portion 28 and the auxiliary power transmitting portion 26 and the positional relationship between the first planetary gear set 18 and the second planetary gear set 20 of the main power transmitting portion 58 are not particularly limited, but may be changed in various ways. In addition, the clutches and brakes may be located to be concentrated in one end portion of the transmission 10, 30, or may be otherwise positioned. Furthermore, the first planetary gear set 18, second planetary gear set 20 and the third planetary gear set 22 are not necessarily disposed on the same axis.

While the vertical lines Y1, Y2, Y3, Y4, Y5 respectively corresponding to the rotating elements RE1, RE2, RE3, RE4, RE5 are arranged in this order from the left to the right in the nomogram of FIG. 3 in the illustrated embodiments, these vertical lines, Y1, Y2, Y3, Y4, Y5 may be arranged in this order from the right to the left. While the horizontal line X2 corresponding to the rotational speed "1" is located above the horizontal line X1 corresponding to the rotational speed "0" in the nomogram of FIG. 3, the horizontal line X2 may be located below the horizontal line X1.

In the illustrated embodiments, the second pinion P2 of the double-pinion type first planetary gear set 18 and the third pinion P3 of the double-pinion type second planetary gear set 20 are coupled to each other on the same axis such that the pinions P2, P3 are rotated as a unit. While the second pinion P2 and the third pinion P3 have different diameters in the illustrated embodiments, these pinions P2, P3 may have the same diameter. It is also to be understood that the diameter (or the number of teeth) of each of the first pinion P1, second pinion P2, third pinion P3 and the fourth pinion P4 may be changed as needed.

While the main power transmitting portion 28 is constituted by two planetary gear sets in the embodiments of FIG. 1 and FIG. 4, the number of the planetary gear sets is not limited to two.

In the main power transmitting portion 28 of the illustrated embodiments, the first rotating element RE1, second rotating element RE2, third rotating element RE3, fourth rotating element RE4, and the fifth rotating element RE5 may be suitably selected from the sun gears, ring gears and carriers of the first planetary gear set 18 and second planetary gear set 20, and those of other planetary gear sets.

Figure 5:
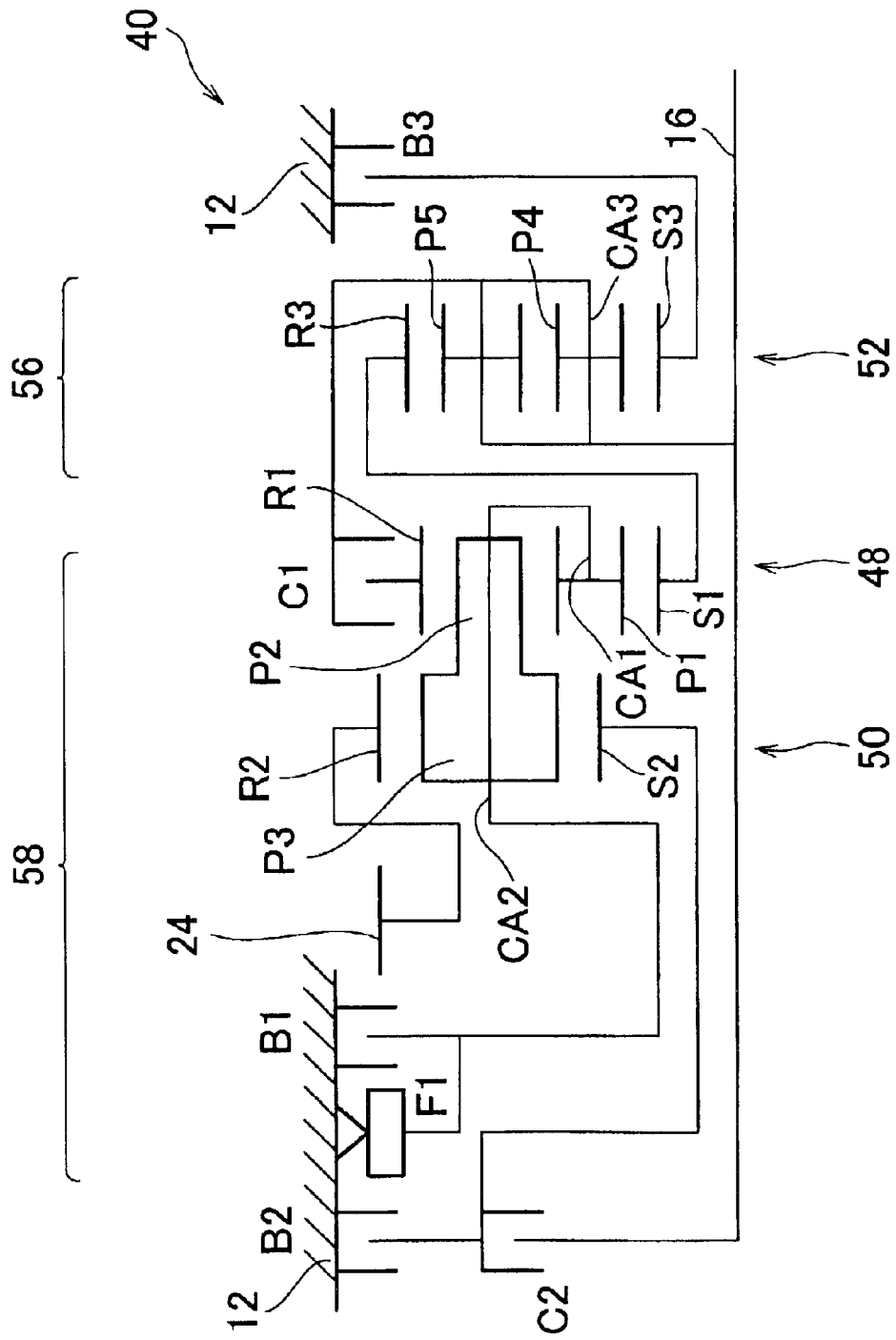
FIG. 5 is a schematic view showing an automatic transmission of a motor vehicle according to a third embodiment of the invention.
Figure 7:
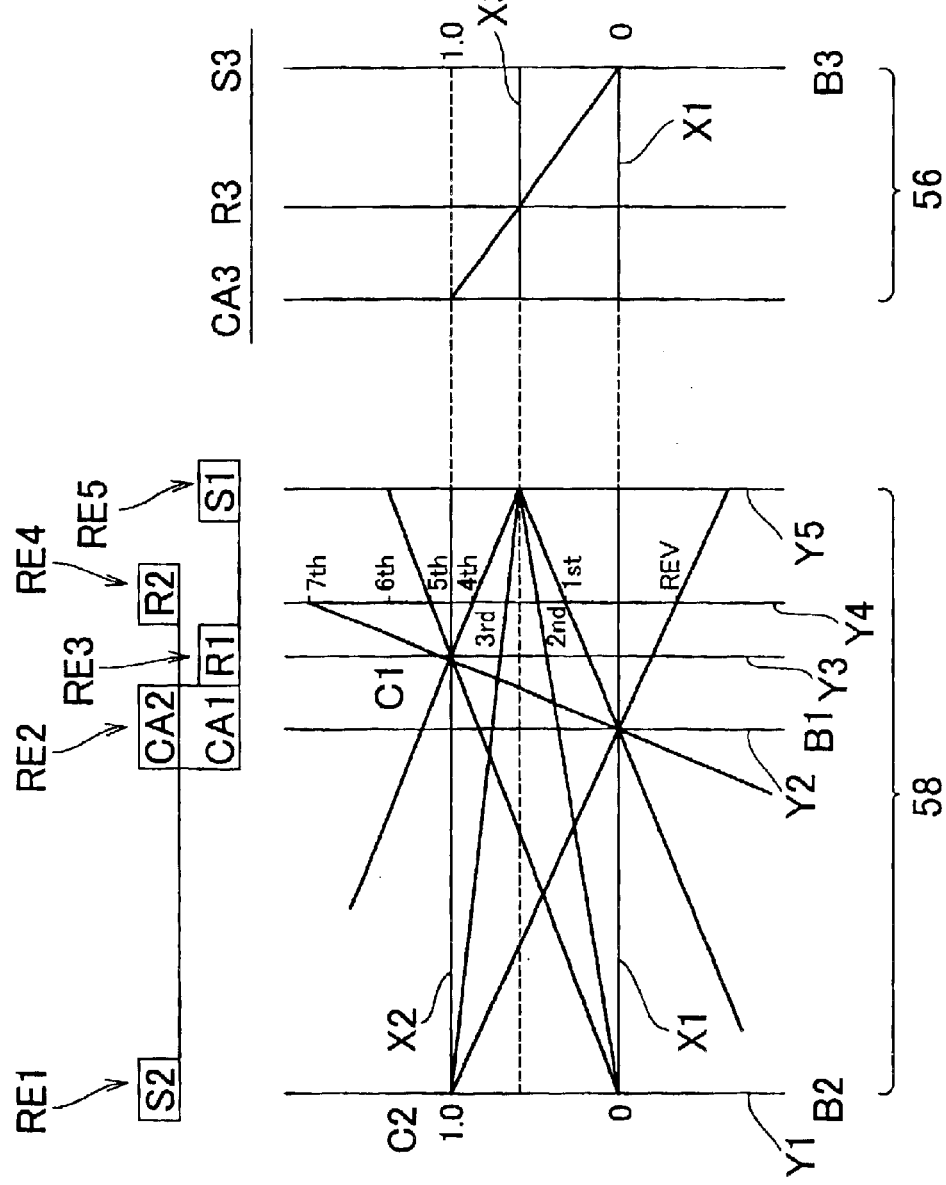
FIG. 7 is a nomogram plotted with respect to the automatic transmission of FIG. 5.

Next, a third embodiment of the invention will be described in detail with reference to FIG. 5, FIG. 6 and FIG. 7. FIG. 5 schematically shows a planetary gear type automatic transmission (hereinafter simply referred to as "transmission") 40 of a motor vehicle according to the third embodiment of the invention. FIG. 6 is an operation table indicating engaging elements and the gear ratio (or speed ratio) with respect to each of a plurality of gear stages or speeds to be established by the transmission 40. FIG. 7 is a nomogram plotted with respect to the transmission of FIG. 5.

Referring first to FIG. 5, the transmission 40 receives rotary power transmitted from an engine (not shown) to an input shaft 16 thereof, changes the speed of rotation at a given gear ratio, and transmits the power from an output gear 24 to right and left driving wheels, via a propeller shaft (not shown), a differential gear unit (not shown), and other members. The transmission 40 includes a torque converter (not shown) provided with a lockup clutch, the input shaft 16 coupled to the torque converter, a third planetary gear set 52, a first planetary gear set 48, and a second planetary gear set 50, which are arranged on the common axis of rotation within a transmission case (non-rotating member) 12 attached to the vehicle body. The transmission 40 further includes the output gear 24 that is disposed at one side of the second planetary gear set 50 remote from the input shaft 16, to be located between the second planetary gear set 50 and a first brake B1. The above-indicated torque converter is coupled to a crankshaft (not shown) of the engine. In this embodiment, the input shaft 16 and the output gear 24 correspond to an input rotating member and an output rotating member, respectively, and the transmission case 12 corresponds to a non-rotating or stationary member. It is to be noted that the transmission 40 is constructed symmetrically with respect to the rotational axis thereof, and that the lower half of the transmission 40 is not shown in FIG. 5 (i.e., only the upper half of the transmission 40 is illustrated in FIG. 5).

The automatic transmission 40 is transversely or laterally installed on, for example, a front engine front drive (FF) vehicle, such that the axis of the transmission 40 extends in the width direction of the vehicle. The transmission 40 includes an auxiliary power transmitting portion 56 that mainly consists of the third planetary gear set 52 of a double pinion type, and a main power transmitting portion 58 that mainly consists of the first planetary gear set 48 of a double pinion type and the second planetary gear set 50 of a single pinion type. The transmission 40 is adapted to establish a selected one of seven forward gear stages having seven different gear ratios $\gamma_n$ and one reverse gear stage, by engaging selected ones of five friction devices. With the selected gear stage thus established, the transmission 40 changes the speed of rotation of the input shaft 16 at a gear ratio corresponding to the gear stage, and transmits the resulting rotary power to the output gear 24.

In the auxiliary power transmitting portion 56, the third planetary gear set 52 includes a third sun gear S3, a third ring gear R3, a fourth pinion P4, a fifth pinion P5, and a third carrier CA3. The third ring gear R3 is disposed coaxially with and radially outwardly of the third sun gear S3, and the fourth pinion P4 meshes with the third sun gear S3, while the fifth pinion P5 meshes with the third ring gear R3. The third carrier CA3 supports the fourth pinion P4 and the fifth pinion P5 that mesh with each other, such that the fourth and fifth pinions P4, P5 are able to rotate about themselves and rotate about the axis of the third planetary gear set 52 (i.e., input shaft 16). The third sun gear S3 is selectively coupled to the transmission case 12 via a third brake B3, such that the sun gear S3 is selectively inhibited from rotating. The third carrier CA3 of the third planetary gear set 52 is coupled to the input shaft 16 such that the carrier CA3 and the input shaft 16 are rotated as a unit. The third carrier CA3 is also selectively coupled to a first ring gear R1 of the first planetary gear set 48 via a first clutch C1, and is coupled to a second sun gear S2 of the second planetary gear set 50 via a second clutch C2, such that power is transmitted directly from the input shaft 16 to the main power transmitting portion 58. The third ring gear R3 of the third planetary gear set 52 functions as an intermediate rotating member which is coupled to a first sun gear S1 of the first planetary gear set 48 so as to output driving power to the main power transmitting portion 58 at an intermediate rotational speed to which the speed of rotation of the input shaft 16 is reduced by the third planetary gear set 52. The third brake B3 serves as an intermediate rotation output friction device which operates, when engaged, to transmit rotary power from the third ring gear R3 to the first sun gear S1 of the main power transmitting portion 58 such that the speed of rotation is reduced as compared with the speed of the input shaft 16.

In the main power transmitting portion 58, the first planetary gear set 48 includes the first sun gear S1, the first ring gear R1, a first pinion P1, a second pinion P2 and a first carrier CA1. The first sun gear S1 is coupled to the third ring gear R3. The first ring gear R1 is selectively coupled to the third carrier CA3 via the first clutch C1. The first pinion P1 meshes with the first sun gear S1 and the second pinion P2 meshes with the first ring gear R1. The first carrier CA1 supports the first pinion P1 and the second pinion P2 that mesh with each other, such that the first and second pinions P1, P2 are able to rotate about themselves and rotate about the axis of the first planetary gear set 48. The second planetary gear set 50 includes the second sun gear S2, a second ring gear R2, a third pinion P3, and a second carrier CA2. The second sun gear S2 is selectively coupled to the transmission case 12 via the second brake B2, and is also selectively coupled to the input shaft 16 via the second clutch C2. The second ring gear R2 is coupled to the output gear 24. The third pinion P3 meshes with the second sun gear S2 and the second ring gear R2, and has a larger diameter than the second pinion P2. The third pinion P3 is coaxially coupled to the second pinion P2 such that the third and second pinions P3, P2 rotate as a unit. The second carrier CA2 supports the third pinion P3 such that the third pinion P3 is able to rotate about itself and rotate about the axis of the second planetary gear set 50. Furthermore, the second carrier CA2 is coupled to the first carrier CA1 such that the first and second carriers CA1, CA2 rotate as a unit, and is also selectively coupled to the transmission case 12 via a first brake B1. A one-way clutch F1 is disposed in parallel with the first brake B1, between the second carrier CA2 and the transmission case 12. The first brake B1 and the one-way clutch F1 may be replaced by only one of the first brake B1 and the one-way clutch F1.

The first clutch C1, second clutch C2, first brake B1, second brake B2 and the third brake B3 are hydraulically operated friction devices, which may be generally used in conventional planetary gear type automatic transmissions. Each of the friction devices serves to selectively couple two members between which the device is interposed, to each other. For example, the friction device may be of a wet multiple disc type in which a plurality of friction discs or plates that are superposed on each other are pressed by a hydraulic actuator, or may be in the form of a band brake in which one end of one or two band(s) wound around the outer periphery of a rotating drum is strained or drawn in by a hydraulic actuator. The one-way clutch F1 disposed in parallel with the first brake B1 also functions as an engaging device equivalent to the first brake, and only one of the one-way clutch F1 and the first brake B1 may be provided.

In the transmission 40 constructed as described above, a selected one of the forward $1^{st}$-speed gear stage through $7^{th}$-speed gear stage and the reverse gear stage is established by engaging two friction devices selected from the first clutch C1, second clutch C2, first brake B1, second brake B2 and the third brake B3 at the same time, as indicated in the operation table of FIG. 6. As described later, the gear ratios γ (=input shaft rotational speed Nin/output shaft rotational speed Nout) of the forward gear stages differ successively at substantially equal ratios (namely, the ratio of the gear ratio γ of one of the forward gear stages to that of the next gear stage is substantially constant.)

More specifically described referring to FIG. 6, the $1^{st}$-speed gear stage having the largest gear ratio $\gamma_1$, which is, for example, equal to about 3.90, is established by engaging the third brake B3 and the first brake B1 so that the third sun gear S3 and the transmission case 12 are coupled to each other and the second carrier CA2 and the transmission case 12 are coupled to each other. The $2^{nd}$-speed gear stage having a gear ratio $\gamma_2$, which is smaller than the gear ratio $\gamma_1$ and is, for example, equal to about 2.64, is established by engaging the third brake B3 and the second brake B2 so that the third sun gear S3 and the transmission case 12 are coupled to each other and the second sun gear S2 and the transmission case 12 are coupled to each other. The $3^{rd}$-speed gear stage having a gear ratio $\gamma_3$, which is smaller than the gear ratio $\gamma_2$ and is, for example, equal to about 1.81, is established by engaging the second clutch C2 and the third brake B3 so that the input shaft 16 and the second sun gear S2 are coupled to each other, and the third sun gear S3 and the transmission case 12 are coupled to each other. The $4^{th}$-speed gear stage having a gear ratio $\gamma_4$, which is smaller than the gear ratio $\gamma_3$ and is, for example, equal to about 1.20, is established by engaging the first clutch C1 and the third brake B3 so that the input shaft 16 and the first ring gear R1 are coupled to each other, and the third sun gear S3 and the transmission case 12 are coupled to each other. The $5^{th}$-speed gear stage having a gear ratio $\gamma_5$, which is smaller than the gear ratio $\gamma_4$ and is, for example, equal to about 1.00, is established by engaging the first clutch C1 and the second clutch C2 so that the input shaft 16 and the first ring gear R1 are coupled to each other, and the input shaft 16 and the second sun gear S2 are coupled to each other. The $6^{th}$-speed gear stage having a gear ratio $\gamma_6$, which is smaller than the gear ratio $\gamma_5$ and is, for example, equal to about 0.91, is established by engaging the first clutch C1 and the second brake B2 so that the input shaft 16 and the first ring gear R1 are coupled to each other and the second sun gear S2 and the transmission case 12 are coupled to each other. The $7^{th}$-speed gear stage having a gear ratio $\gamma_7$, which is smaller than the gear ratio $\gamma_6$ and is, for example, equal to about 0.65, is established by engaging the first clutch C1 and the first brake B1 so that the input shaft 16 and the first ring gear R1 are coupled to each other and the second carrier CA2 and the transmission case 12 are coupled to each other. The reverse gear stage having a gear ratio $\gamma_R$, which is between the gear ratio $\gamma_1$ and the gear ratio $\gamma_2$ and is, for example, equal to about 2.79, is established by engaging the second clutch C2 and the first brake B1 so that the input shaft 16 and the second sun gear S2 are coupled to each other and the second carrier CA2 and the transmission case 12 are coupled to each other. The gear ratio (=the number of teeth of the sun gear/the number of teeth of the ring gear) $\rho_1$ of the first planetary gear set 48, the gear ratio $\rho_2$ of the second planetary gear set 50, and the gear ratio $\rho_3$ of the third planetary gear set 52 are determined so as to provide the gear ratios $\gamma_1$–$\gamma_7$ and $\gamma_R$ as indicated above. For example, $\rho_1$ is equal to 0.36, $\rho_2$ is equal to 0.36, and $\rho_3$ is equal to 0.54.

In the transmission 40 as described above, the rate of change of the gear ratio (i.e., ratio of the gear ratios of the adjacent gear stages=$\gamma_n/\gamma_{n+1}$) may be determined as follows: the ratio (=$\gamma_1/\gamma_2$) of the gear ratio $\gamma_1$ of the $1^{st}$-speed gear stage to the gear ratio $\gamma_2$ of the $2^{nd}$-speed gear stage is 1.48, the ratio (=$\gamma_2/\gamma_3$) of the gear ratio $\gamma_2$ of the $2^{nd}$-speed gear stage to the gear ratio $\gamma_3$ of the $3^{rd}$-speed gear stage is 1.46, the ratio (=$\gamma_3/\gamma_4$) of the gear ratio $\gamma_3$ of the $3^{rd}$-speed gear stage to the gear ratio $\gamma_4$ of the $4^{th}$-speed gear stage is 1.51, the ratio (=$\gamma_4/\gamma_5$) of the gear ratio $\gamma_4$ of the $4^{th}$-speed gear stage to the gear ratio $\gamma_5$ of the $5^{th}$-speed gear stage is 1.20, the ratio (=$\gamma_5/\gamma_6$) of the gear ratio $\gamma_5$ of the $5^{th}$-speed gear stage to the gear ratio $\gamma_6$ of the $6^{th}$-speed gear stage is 1.10, and the ratio (=$\gamma_6/\gamma_7$) of the gear ratio $\gamma_6$ of the $6^{th}$-speed gear stage to the gear ratio $\gamma_7$ of the $7^{th}$-speed gear stage is 1.40. Thus, the gear ratios γ change at substantially equal ratios or rates. Also, in the transmission 40, the total width of the gear ratios ($\gamma_1/\gamma_7$), namely, the ratio of the gear ratio $\gamma_1$ of the $1^{st}$-speed gear stage to the gear ratio $\gamma_7$ of the $7^{th}$-speed gear stage, is a sufficiently large value, which is, for example, 6.00. Also, the gear ratio of the reverse gear stage "Rev" is an appropriate value. Thus, the transmission 40 provides appropriate gear-ratio (speed-change) characteristics over the entire range of operation.

FIG. 7 is a nomogram in which straight lines represent the relationships of the speeds of rotation of rotating elements (as described later) which are in different coupling states for respective gear stages. The nomogram of FIG. 7 is a two-dimensional coordinate system in which the horizontal axis indicates the relationship among the gear ratios ρ of the respective planetary gear sets 48, 50, 52, and the vertical axis indicates relative rotational speeds. In the nomogram of FIG. 7, the lower horizontal line X1, out of three horizontal lines, indicates rotational speed "0", and the middle horizontal line X3 indicates a rotation speed lower than the speed of rotation of the input shaft 16, while the upper horizontal line X2 indicates rotational speed "1.0", which is equal to the speed of rotation of the input shaft 16. Five vertical lines Y1 through Y5 arranged from the left to the right in the section of the main power transmitting portion 58 respectively represent the second sun gear S2 corresponding to the first rotating element RE1, the first carrier CA1 and the second carrier CA2 that are coupled to each other and correspond to the second rotating element RE2, the first ring gear R1 corresponding to the third rotating element RE3, the second ring gear R2 corresponding to the fourth rotating element RE4, and the first sun gear S1 corresponding to the fifth rotating element RE5. The intervals of these vertical lines are determined in accordance with the gear ratio $\rho_1$ of the first planetary gear set 48 and the gear ratio $\rho_2$ of the second planetary gear set 50. More specifically, the interval between the vertical lines corresponding to the sun gear and the carrier is set as "1", and the interval between the vertical lines corresponding to the carrier and the ring gear is set as "$\rho$".

The main power transmitting portion 58 will be described by utilizing the nomogram of FIG. 7. Parts of the first sun gear S1, first carrier CA1 and the first ring gear R1 of the first planetary gear set 48 and the second sun gear S2, second carrier CA2 and the second ring gear R2 of the second planetary gear set 50 are coupled to each other so as to provide five rotating elements RE1 through RE5. In the monogram of FIG. 7, the speeds of rotation of the five rotating elements RE1 through RE5 are represented by straight lines, and the first rotating element RE1, second rotating element RE2, third rotating element RE3, fourth rotating element RE4 and the fifth rotating element RE5 are arranged in this order from one end (i.e., the left end in FIG. 7) to the other end (i.e., the right end in FIG. 7). In the transmission 40 of this embodiment, the first rotating element RE1 (S2) is selectively inhibited from rotating by the second brake B2, and is selectively coupled to the input shaft 16 (input member) via the second clutch C2. The second rotating element RE2 (CA1, CA2) is selectively inhibited from rotating by the first brake B1, and the third rotating element RE3 (R1) is selectively coupled to the input shaft 16 (input member) via the first clutch C1. The fifth rotating element RE5 (S1) is coupled to the third ring gear R3 (intermediate rotating member), and the fourth rotating element RE4 (R2) is coupled to the output gear 24 (output member).

As is apparent from the nomogram of FIG. 7, when the third brake B3 and the first brake B1 are engaged, and the third sun gear S3 is inhibited from rotating while the second rotating element RE2 (CA1, CA2) is also inhibited from rotating, the fourth rotating element RE4 (R2) is rotated at a speed denoted by "$1^{st}$" in FIG. 7, so that the $1^{st}$-speed gear stage having the largest gear ratio is established. When the third brake B3 and the second brake B2 are engaged, and the third sun gear S3 is inhibited from rotating while the first rotating element RE1 (S2) is also inhibited from rotating, the fourth rotating element RE4 (R2) is rotated at a speed denoted by "$2^{nd}$" in FIG. 7, so that the $2^{nd}$-speed gear stage having a smaller gear ratio than that of the $1^{st}$-speed gear stage is established. When the second clutch C2 and the third brake B3 are engaged, and the first rotating element RE1 (S2) is rotated at the same speed as the input shaft 16 while the third sun gear S3 is inhibited from rotating, the fourth rotating element RE4 (R2) is rotated at a speed denoted by "$3^{rd}$" in FIG. 7, so that the $3^{rd}$-speed gear stage having a smaller gear ratio than that of the $2^{nd}$-speed gear stage is established. When the first clutch C1 and the third brake B3 are engaged, and the third rotating element RE3 (R1) is rotated at the same speed as the input shaft 16 while the third sun gear S3 is inhibited from rotating, the fourth rotating element RE4 (R2) is rotated at a speed denoted by "$4^{th}$" in FIG. 7, so that the $4^{th}$-speed gear stage having a smaller gear ratio than that of the $3^{rd}$-speed gear stage is established. When the first clutch C1 and the second clutch C2 are engaged, and the third rotating element RE3 (R1) is rotated along with the input shaft 16 while the first rotating element RE1 (S2) is also rotated along with the input shaft 16, the fourth rotating element RE4 (R2) is rotated at a speed denoted by "$5^{th}$" in FIG. 7, namely, at the same speed as the input shaft 16, so that the $5^{th}$-speed gear stage having a smaller gear ratio than that of the $4^{th}$-speed gear stage is established. The gear ratio of the $5^{th}$-speed gear stage is equal to 1. When the first clutch C1 and the second brake B2 are engaged, and the third rotating element RE3 (R1) is rotated along with the input shaft 16 while the first rotating element RE1 (S2) is inhibited from rotating, the fourth rotating element RE4 (R2) is rotated at a speed denoted by "$6^{th}$" in FIG. 7, so that the $6^{th}$-speed gear stage having a smaller gear ratio than that of the $5^{th}$-speed gear stage is established. When the first clutch C1 and the first brake B1 are engaged, and the third rotating element RE3 (R1) is rotated along with the input shaft 16 while the second rotating element RE2 (CA1, CA2) is inhibited from rotating, the fourth rotating element RE4 (R2) is rotated at a speed denoted by "$7^{th}$" in FIG. 7, so that the $7^{th}$-speed gear stage having a smaller gear ratio than that of the $6^{th}$-speed gear stage is established.

When the second clutch C2 and the first brake B1 are engaged, and the first rotating element RE1 (S2) is rotated along with the input shaft 16 while the second rotating element RE2 (CA1, CA2) is inhibited from rotating, the fourth rotating element RE4 (R2) is rotated in the reverse direction at a speed denoted by "REV" in FIG. 7, so that the reverse gear stage "Rev" is established.

As described above, the automatic transmission 40 of the present embodiment is able to establish seven forward gear stages by using three gear sets, i.e., the first planetary gear set 48, second planetary gear set 50, and the third planetary gear set 52, and a total of five friction devices, i.e., two clutches C1 and C2 and three brakes B1, B2 and B3. Thus, the weight and size of the transmission 40 can be reduced as compared with the case where four planetary gear sets are used, thus making it easier to install the transmission 40 on the vehicle. At the same time, the number of friction devices required for shifting the transmission 40 is reduced, resulting in a reduced number of components and reduced cost. Furthermore, the drag resistance is reduced, and the fuel economy can be further improved.

In the third embodiment as described above, the second pinion P2 of the double-pinion type first planetary gear set 48 and the third pinion P3 of the single-pinion type second planetary gear set 50 are coupled to each other on the same axis so that these pinions P2, P3 are rotated as a unit. Like Ravigneaux type planetary gear trains, this arrangement requires a further reduced number of components and further reduced axial length, which result in further reduction in the size and cost of the transmission 40.

In the third embodiment as described above, the main power transmitting portion 58 includes the first planetary gear set 48 and the second planetary gear set 50, and the first rotating element RE1 is the second sun gear S2, the second rotating element RE2 consists of the first carrier CA1 and the second carrier CA2, the third rotating element RE3 is the first ring gear R1, the fourth rotating element RE4 is the second ring gear R2, and the fifth rotating element RE5 is the first sun gear S1. With this arrangement, the automatic transmission 40 having seven forward gear stages can be made compact.

Next, a fourth embodiment of the invention will be described. In the following description, the same reference numerals as used in the third embodiment will be used for identifying corresponding elements or portions, of which no detailed description is provided.

Figure 8:
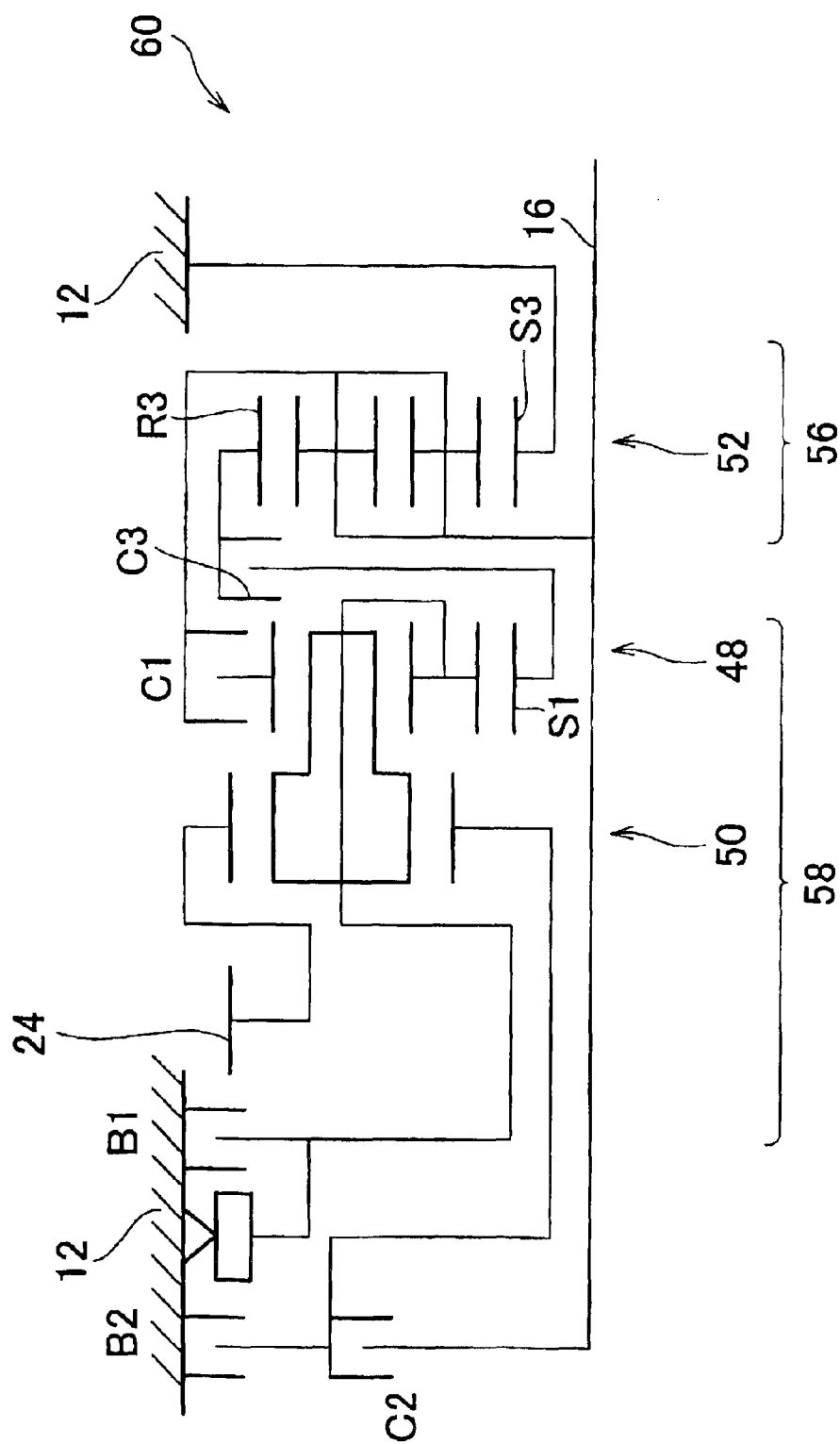
FIG. 8 is a schematic view showing an automatic transmission of a motor vehicle according to a fourth embodiment of the invention, as a modified example of the automatic transmission of FIG. 5.

FIG. 8 schematically shows the construction of an automatic transmission 60 that provides seven forward gear stages by using five friction devices, like the transmission 40 of the third embodiment. The transmission 60 is different from the transmission 40 in that the third sun gear S3 of the auxiliary power transmitting portion 56 is coupled to the transmission case 12 such that the sun gear S3 is inhibited from rotating, and that a third clutch C3 is provided between the third ring gear R3 and the first sun gear S1, such that the third ring gear R3 and the first sun gear S1 are selectively coupled to each other. The transmission 60 is similar to the transmission 40 in the other aspects. In the fourth embodiment, the third clutch C3 similar to the third brake B3 of the transmission 40 functions as an intermediate rotation output friction device, which operates, when engaged, to transmit rotary power from the third ring gear R3 serving as an intermediate rotating member to the first sun gear S1 of the main power transmitting portion 58 at a lower speed than that of the input shaft 16. Thus, the transmission 60 is able to establish seven forward gear stages based on an operation table similar to that of FIG. 6 and a nomogram similar to that of FIG. 7, in which the third brake B3 is replaced by the third clutch C3. The rotating elements RE1, RE2, RE3, RE4 and RE5 of this embodiment are identical with those of the third embodiment.

Figure 9:
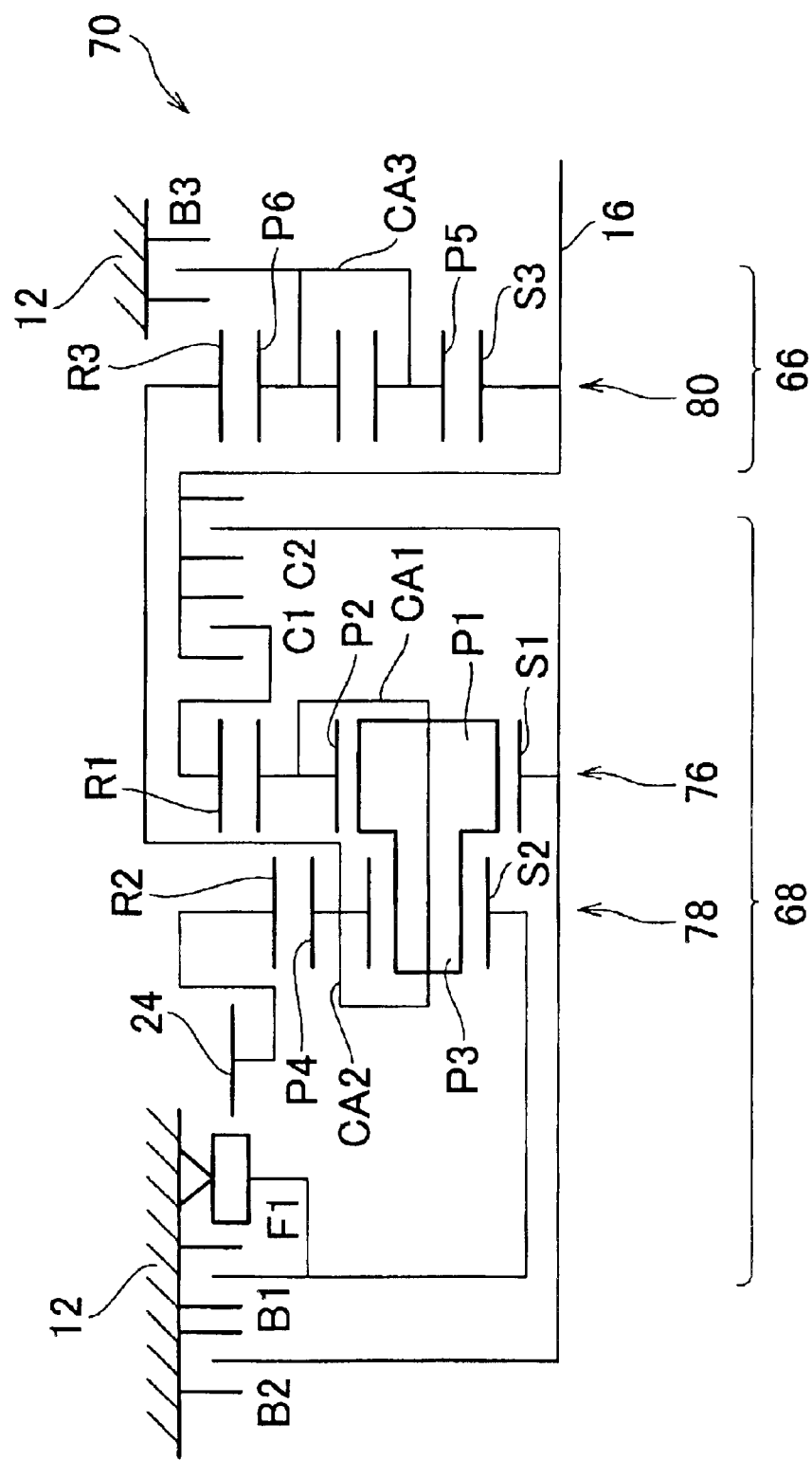
FIG. 9 is a schematic view showing an automatic transmission of a motor vehicle according to a fifth embodiment of the invention.
Figure 10:
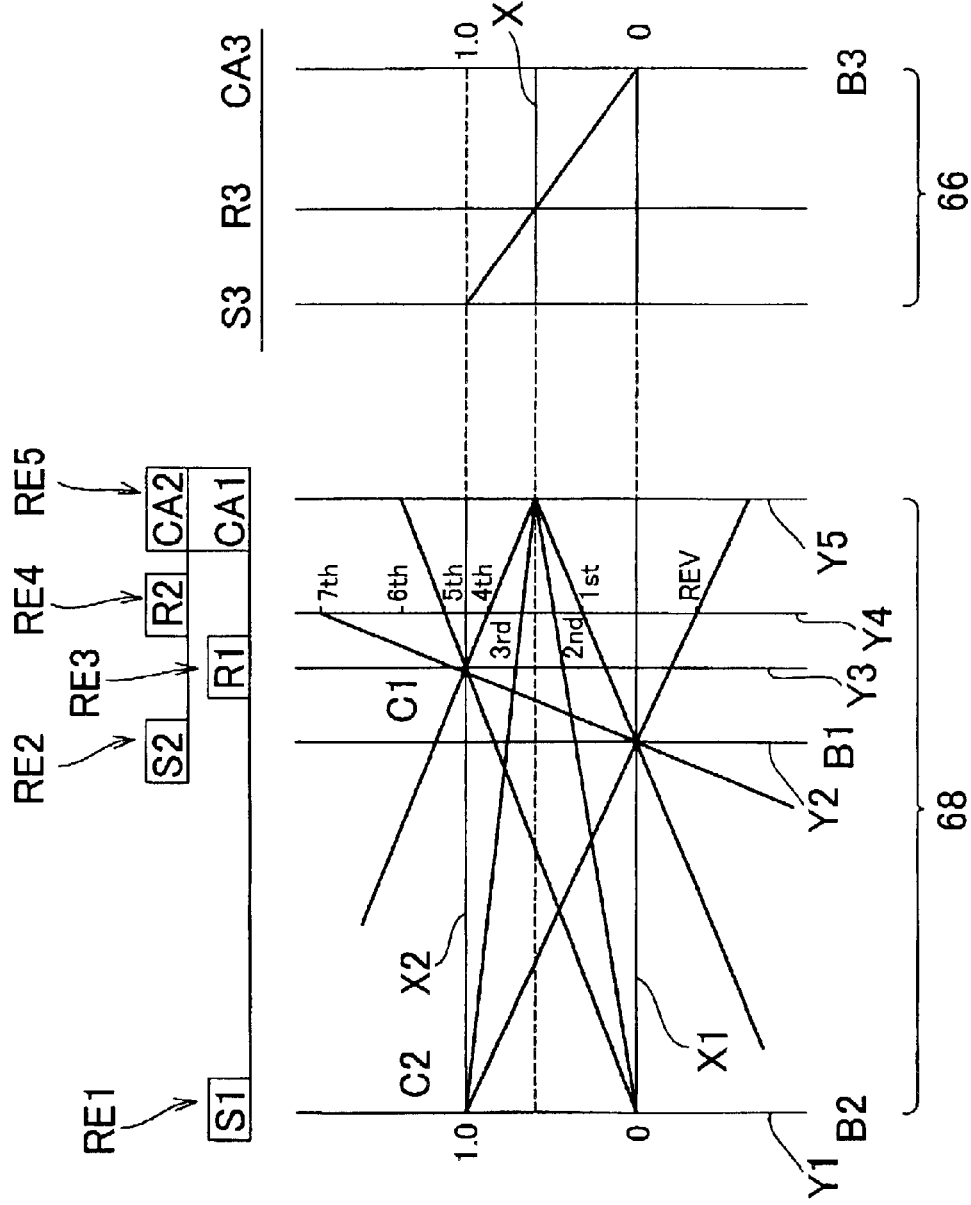
FIG. 10 is a nomogram plotted with respect to the automatic transmission of FIG. 9.

Next, a fifth embodiment of the invention will be described. FIG. 9 schematically shows the construction of an automatic transmission 70 that provides seven forward gear stages by using three planetary gear sets, like the transmission 40 and the transmission 60 of the third and fourth embodiments. FIG. 10 is a nomogram plotted with respect to the transmission of FIG. 9. An operation table indicating the combination of friction devices used for establishing each of a plurality of gear stages is similar to that of FIG. 6, and is therefore omitted. The transmission 70 of this embodiment includes an auxiliary power transmitting portion 66 that mainly consists of a third planetary gear set 80 of a double pinion type, and a main power transmitting portion 68 that mainly consists of a first planetary gear set 76 of a double pinion type and a second planetary gear set 78 of a double pinion type. The transmission 70 is adapted to establish a selected one of seven forward gear stages having seven different gear ratios $\gamma_n$ and one reverse gear stage, by engaging selected ones of five friction devices. With the selected gear stage thus established, the transmission 70 changes the speed of rotation of the input shaft 16 at a gear ratio corresponding to the gear stage, and transmits the resulting rotary power to the output gear 24. As shown in FIG. 9, the third planetary gear set 80, first planetary gear set 76 and the second planetary gear set 78 are arranged in this order from the side of the input shaft 16 along the axis of rotation thereof.

In the auxiliary power transmitting portion 66, the third planetary gear set 80 includes a third sun gear S3, a third ring gear R3, a fifth pinion P5, a sixth pinion P6, and a third carrier CA3. The third sun gear S3 is coupled to the input shaft 16, and the third ring gear R3 is disposed coaxially with and radially outwardly of the third sun gear S3. The fifth pinion P5 meshes with the third sun gear S3, and the sixth pinion P6 meshes with the third ring gear R3. The third carrier CA3 supports the fifth pinion P5 and the sixth pinion P6 that mesh with each other, such that the fifth and sixth pinions P5, P6 are able to rotate about themselves and rotate about the axis of the third planetary gear set 80 (i.e., input shaft 16). The third carrier CA3 is also selectively coupled to the transmission case 12 via a third brake B3. In the third planetary gear set 80, when the third carrier CA3 is inhibited from rotating by engagement of the third brake B3, the third ring gear R3 reduces the speed of rotation of the third sun gear S3 coupled to the input shaft 16, and transmits the reduced-speed rotation to the first carrier CA1 and the second carrier CA2 of the main power transmitting portion 68. Thus, the third ring gear R3 functions as an intermediate rotating member which is adapted to rotate at a lower speed than the input shaft 16 when the third brake B3 serving as an intermediate rotation output friction device is engaged, so as to transmit rotary power to the main power transmitting portion 68 at a lower rotational speed than that of the input shaft 16.

In the main power transmitting portion 68, the first planetary gear set 76 includes a first sun gear S1, a first ring gear R1, a first pinion P1, a second pinion P2 and a first carrier CA1. The first sun gear S1 is selectively coupled to the transmission case 12 via a second brake B2, and is also selectively coupled to the input shaft 16 via a second clutch C2. The first ring gear R1 is selectively coupled to the input shaft 16 via a first clutch C1. The first pinion P1 meshes with the first sun gear S1 and the second pinion P2 meshes with the first ring gear R1. The first carrier CA1 supports the first pinion P1 and the second pinion P2 that mesh with each other, such that the first and second pinions P1, P2 are able to rotate about themselves and rotate about the axis of the first planetary gear set 76. The second planetary gear set 78 includes a second sun gear S2, a second ring gear R2, a third pinion P3, a fourth pinion P4, and a second carrier CA2. The second sun gear S2 is selectively coupled to the transmission case 12 via a first brake B1, and the second ring gear R2 is coupled to the output gear 24. The third pinion P3 meshes with the second sun gear S2, and has a smaller diameter than the first pinion P1. The third pinion P3 is coaxially coupled to the first pinion P1 such that the first and third pinions P1, P3 rotate as a unit. The fourth pinion P4 meshes with the second ring gear R2. The second carrier CA2 supports the third pinion P3 and the fourth carrier P4 that mesh with each other such that the third and fourth pinions P3, P4 are able to rotate about themselves and rotate about the axis of the second planetary gear set 78. Furthermore, the second carrier CA2 is coupled to the first carrier CA1 such that the first and second carriers CA1, CA2 rotate as a unit, and is also coupled to the third ring gear R3.

The first pinion P1 and the third pinion P3 may be formed by gear cutting from the same member, or may be formed from different members and fixed integrally with each other. While the first pinion P1 has a larger diameter than the third pinion P3, the diameter of the first pinion P1 may be made equal to or smaller than that of the third pinion P3 so as to provide appropriate gear ratios $\gamma$. In this embodiment, a one-way clutch F1 is provided in parallel with the first brake B1 disposed between the second sun gear S2 and the transmission case 12. The first brake B1 and the one-way clutch F1 may be replaced by either of the first brake B1 and the one-way clutch F1.

In the transmission 70 constructed as described above, a selected one of the forward $1^{st}$-speed gear stage through $7^{th}$-speed gear stage and the reverse gear stage is established by engaging two friction devices selected from five friction devices, i.e., the first clutch C1, second clutch C2, first brake B1, second brake B2 and the third brake B3 at the same time, as indicated in the operation table of FIG. 6. As described later, the gear ratios γ of the forward gear stages change at substantially equal ratios (namely, the ratio of the gear ratio γ of one of the forward gear stages to that of the next gear stage is substantially constant.)

In the main power transmitting portion 68 of the transmission 70 of the fifth embodiment, parts of the first sun gear S1, first carrier CA1 and the first ring gear R1 of the first planetary gear set 76 and the second sun gear S2, second carrier CA2 and the second ring gear R2 of the second planetary gear set 78 are coupled to each other so as to provide five rotating elements RE1 through RE5, as shown in the monogram of FIG. 10. In the monogram of FIG. 10, the speeds of rotation of the five rotating elements RE1 through RE5 are represented by straight lines, and the first rotating element RE1, second rotating element RE2, third rotating element RE3, fourth rotating element RE4 and the fifth rotating element RE5 are arranged in this order from one end (i.e., the left end in FIG. 10) to the other end (i.e., the right end in FIG. 10). In the transmission 70 of this embodiment, the first rotating element RE1 (S1) is selectively inhibited from rotating by the second brake B2, and is selectively coupled to the input shaft 16 (input member) via the second clutch C2. The second rotating element RE2 (S2) is selectively inhibited from rotating by the first brake B1, and the third rotating element RE3 (R1) is selectively coupled to the input shaft 16 (input member) via the first clutch C1. The fifth rotating element RE5 (CA1, CA2) is coupled to the third ring gear R3 (intermediate rotating member), and the fourth rotating element RE4 (R2) is coupled to the output gear 24 (output member).

As is apparent from the nomogram of FIG. 10, when the third brake B3 and the first brake B1 are engaged, and the third carrier CA3 is inhibited from rotating while the second rotating element RE2 (S2) is also inhibited from rotating, the fourth rotating element RE4 (R2) is rotated at a speed denoted by "$1^{st}$" in FIG. 10, so that the $1^{st}$-speed gear stage having the largest gear ratio is established. When the third brake B3 and the second brake B2 are engaged, and the third carrier CA3 is inhibited from rotating while the first rotating element RE1 (S1) is also inhibited from rotating, the fourth rotating element RE4 (R2) is rotated at a speed denoted by "$2^{nd}$" in FIG. 10, so that the $2^{nd}$-speed gear stage having a smaller gear ratio than that of the $1^{st}$-speed gear stage is established. When the second clutch C2 and the third brake B3 are engaged, and the first rotating element RE1 (S1) is rotated at the same speed as the input shaft 16 while the third carrier CA3 is inhibited from rotating, the fourth rotating element RE4 (R2) is rotated at a speed denoted by "$3^{rd}$" in FIG. 10, so that the $3^{rd}$-speed gear stage having a smaller gear ratio than that of the $2^{nd}$-speed gear stage is established. When the first clutch C1 and the third brake B3 are engaged, and the third rotating element RE3 (R1) is rotated at the same speed as the input shaft 16 while the third carrier CA3 is inhibited from rotating, the fourth rotating element RE4 (R2) is rotated at a speed denoted by "$4^{th}$" in FIG. 10, so that the $4^{th}$-speed gear stage having a smaller gear ratio than that of the $3^{rd}$-speed gear stage is established. When the first clutch C1 and the second clutch C2 are engaged, and the third rotating element RE3 (R1) is rotated along with the input shaft 16 while the first rotating element RE1 (S1) is also rotated along with the input shaft 16, the fourth rotating element RE4 (R2) is rotated at a speed denoted by "$5^{th}$" in FIG. 10, namely, at the same speed as the input shaft 16, so that the $5^{th}$-speed gear stage having a smaller gear ratio than that of the $4^{th}$-speed gear stage is established. The gear ratio of the $5^{th}$-speed gear stage is equal to 1. When the first clutch C1 and the second brake B2 are engaged, and the third rotating element RE3 (R1) is rotated along with the input shaft 16 while the first rotating element RE1 (S1) is inhibited from rotating, the fourth rotating element RE4 (R2) is rotated at a speed denoted by "$6^{th}$" in FIG. 10, so that the $6^{th}$-speed gear stage having a smaller gear ratio than that of the $5^{th}$-speed gear stage is established. When the first clutch C1 and the first brake B1 are engaged, and the third rotating element RE3 (R1) is rotated along with the input shaft 16 while the second rotating element RE2 (S2) is inhibited from rotating, the fourth rotating element RE4 (R2) is rotated at a speed denoted by "$7^{th}$" in FIG. 10, so that the $7^{th}$-speed gear stage having a smaller gear ratio than that of the $6^{th}$-speed gear stage is established.

When the second clutch C2 and the first brake B1 are engaged, and the first rotating element RE1 (S1) is rotated along with the input shaft 16 while the second rotating element RE2 (S2) is inhibited from rotating, the fourth rotating element RE4 (R2) is rotated in the reverse direction at a speed denoted by "REV" in FIG. 10, so that the reverse gear stage "Rev" is established.

As described above, the automatic transmission 70 of the present embodiment is able to establish seven forward gear stages by using five friction devices, i.e., two clutches C1, C2 and three brakes B1, B2 and B3, in a similar manner to the transmission 40 of FIG. 5. Thus, the number of friction devices required for shifting the transmission 70 is reduced, resulting in a reduced number of components and reduced cost. Furthermore, the drag resistance is reduced, and the fuel economy can be further improved.

Figure 11:
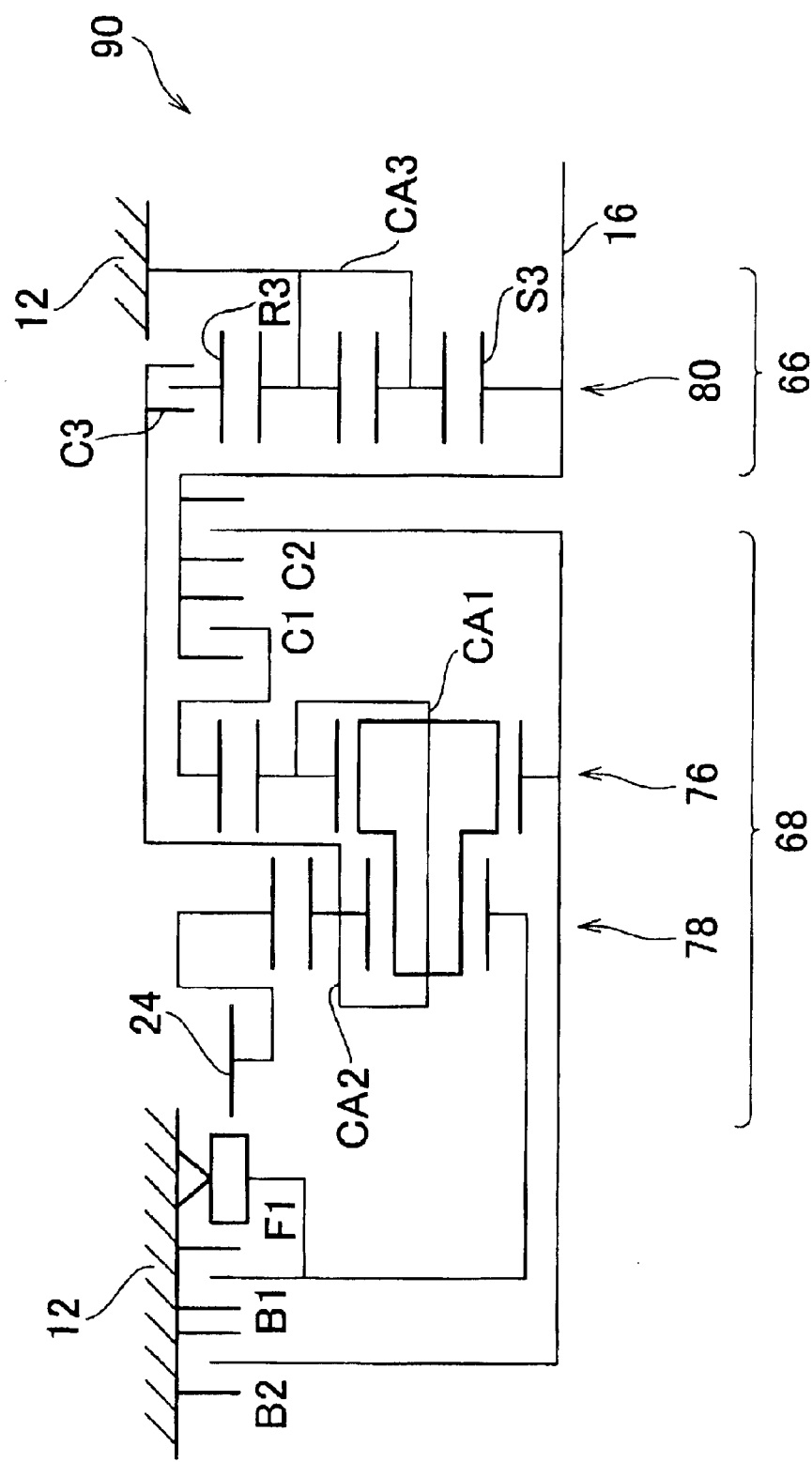
FIG. 11 is a schematic view showing an automatic transmission of a motor vehicle according to a sixth embodiment of the invention, as a modified example of the automatic transmission of FIG. 9.

Next, a sixth embodiment of the invention will be described. FIG. 11 schematically shows the construction of an automatic transmission 90 that provides seven forward gear stages by using five friction devices, like the transmission 70 of the fifth embodiment. The transmission 90 is different from the transmission 70 in that the third carrier CA3 of the auxiliary power transmitting portion 66 is directly coupled to the transmission case 12 so as to be inhibited from rotating, and that a third clutch C3 is provided between the third ring gear R3 and the first and second carriers CA1, CA2, such that the third ring gear R3 and the first and second carriers CA1, CA2 are selectively coupled to each other. The transmission 90 is similar to the transmission 70 in the other aspects. In the sixth embodiment, the third clutch C3 similar to the third brake B3 of the transmission 70 functions as an intermediate rotation output friction device, which operates, when engaged, to transmit rotary power from the third ring gear R3 serving as an intermediate rotating member to the first and second carriers CA1, CA2 of the main power transmitting portion 68 at a lower speed than that of the input shaft 16. Thus, the transmission 90 is able to establish seven forward gear stages based on an operation table similar to that of FIG. 6 and a nomogram similar to that of FIG. 10, in which the third brake B3 is replaced by the third clutch C3. The rotating elements RE1, RE2, RE3, RE4 and RE5 of this embodiment are identical with those of the transmission 70 of the fifth embodiment.

Figure 12:
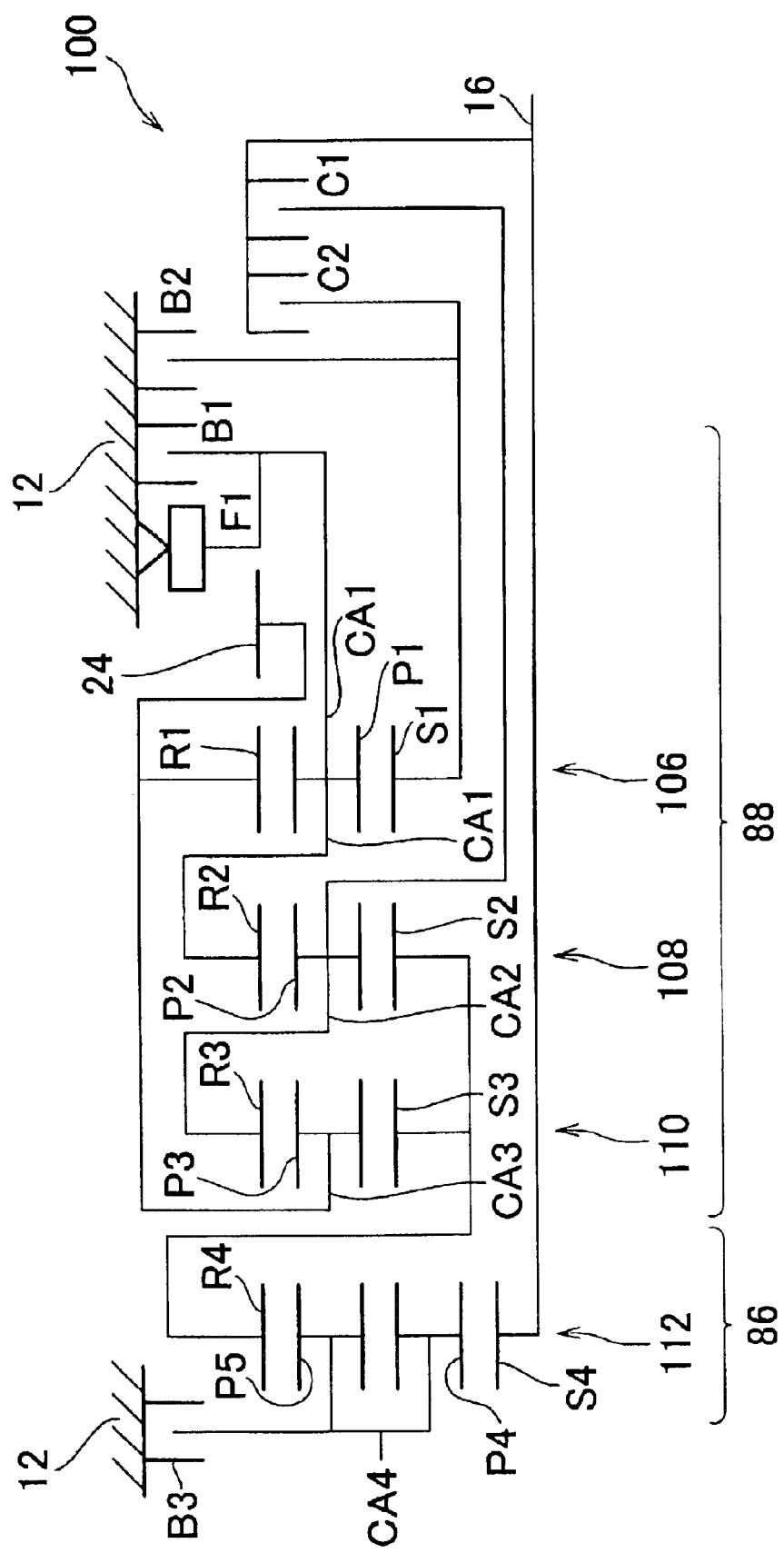
FIG. 12 is a schematic view showing an automatic transmission of a motor vehicle according to a seventh embodiment of the invention.
Figure 13:
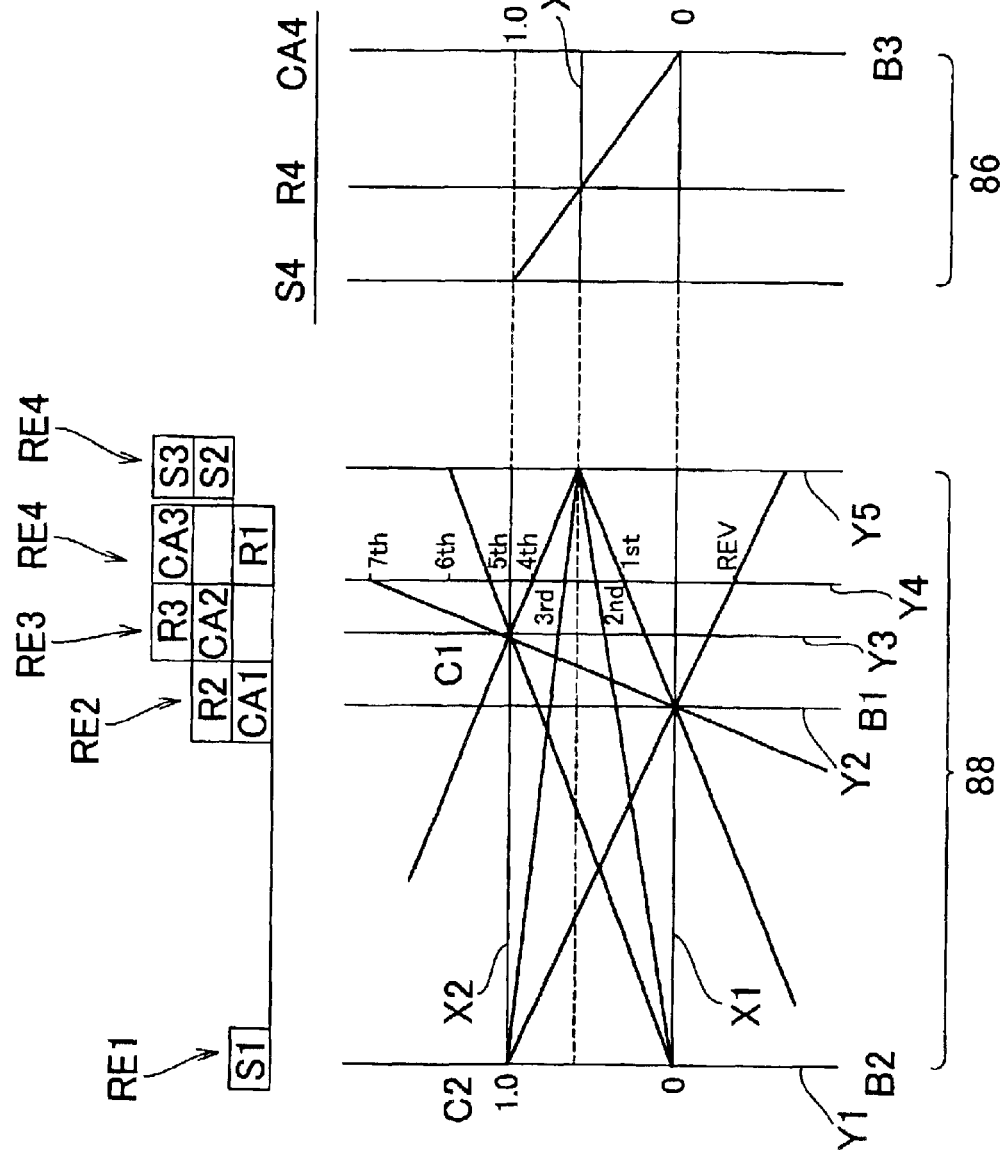
FIG. 13 is a nomogram plotted with respect to the automatic transmission of FIG. 12.

Next, a seventh embodiment of the invention will be described. FIG. 12 schematically shows the construction of an automatic transmission 100 that provides seven forward gear stages by using five friction devices, like the transmission 40 and the transmission 70 of the third and fifth embodiments. FIG. 13 is a monogram plotted with respect to the transmission of FIG. 10. An operation table indicating the combination of engaging devices used for establishing each of a plurality of gear stages is similar to that of FIG. 6, and is therefore omitted. The transmission 100 of this embodiment includes an auxiliary power transmitting portion 86 that mainly consists of a fourth planetary gear set 112 of a double pinion type, and a main power transmitting portion 88 that mainly consists of a first planetary gear set 106, a second planetary gear set 108, and a third planetary gear set 110, all of which are of a single pinion type. The transmission 100 is adapted to establish a selected one of seven forward gear stages having seven different gear ratios $\gamma_n$ and one reverse gear stage, by engaging selected ones of five friction devices. With the selected gear stage thus established, the transmission 100 changes the speed of rotation of the input shaft 16 at a gear ratio corresponding to the selected gear stage, and transmits the resulting rotary power to the output gear 24. As shown in FIG. 12, the first planetary gear set 106, second planetary gear set 108, third planetary gear set 110 and the fourth planetary gear set 112 are coaxially arranged in this order from the side of the input shaft 16 along the axis of rotation thereof.

In the auxiliary power transmitting portion 86, the fourth planetary gear set 112 includes a fourth sun gear S4, a fourth ring gear R4, a fourth pinion P4, a fifth pinion P5 and a fourth carrier CA4. The fourth sun gear S4 is coupled to the input shaft 16, and the fourth ring gear R4 is disposed coaxially with and radially outwardly of the fourth sun gear S4, and is coupled to a second sun gear S2 and a third sun gear S3. The fourth pinion P4 meshes with the fourth sun gear S4, and the fifth pinion P5 meshes with the fourth ring gear R4. The fourth carrier CA4 supports the fourth pinion P4 and the fifth pinion P5 that mesh with each other, such that the fourth and fifth pinions P4, P5 are able to rotate about themselves and rotate about the axis of the fourth planetary gear set 112 (i.e., input shaft 16). The fourth carrier CA4 is also selectively coupled to the transmission case 12 via a third brake B3. In the fourth planetary gear set 112, when the fourth carrier CA4 is inhibited from rotating by engagement of the third brake B3, the fourth ring gear R4 reduces the speed of rotation of the fourth sun gear S4 coupled to the input shaft 16, and transmits the reduced-speed rotation to the second sun gear S2 and the third sun gear S3 of the main power transmitting portion 88. Thus, the fourth ring gear R4 functions as an intermediate rotating member which is adapted to rotate at a lower speed than the input shaft 16 so as to transmit rotary power to the main power transmitting portion 88 at a lower rotational speed than that of the input shaft 16. Also, the third brake B3 functions as an intermediate rotation output friction device which operates, when engaged, to transmit rotary power from the fourth ring gear R4 to the second sun gear S2 and the third sun gear S3 of the main power transmitting portion 88 at a speed lower than that of the input shaft 16.

In the main power transmitting portion 88, the first planetary gear set 106 includes the first sun gear S1, a first ring gear R1, a first pinion P1 and a first carrier CA1. The first sun gear S1 is selectively coupled to the input shaft 16 via a second clutch C2, and the first ring gear R1 is coupled to the output gear 24. The first pinion P1 meshes with the first sun gear S1 and the first ring gear R1. The first carrier CA1 supports the first pinion P1 such that the first pinion P1 is able to rotate about itself and rotate about the axis of the first planetary gear set 106. The first carrier CA1 is also selectively coupled to the transmission case 12 via a first brake B1. The second planetary gear set 108 includes the second sun gear S2, a second ring gear R2, a second pinion P2 and a second carrier CA2. The second sun gear S2 is coupled to the fourth ring gear R4 serving as an intermediate rotating member. The second ring gear R2 is coupled to the first carrier CA1, and is also selectively coupled to the transmission case 12 via the first brake B1. The second pinion P2 meshes with the second sun gear S2 and the second ring gear R2. The second carrier CA2 supports the second pinion P2 such that the second pinion P2 is able to rotate about itself and rotate about the axis of the second planetary gear set 108. The second carrier CA2 is also selectively coupled to the input shaft 16 via a first clutch C1. The third planetary gear set 110 includes a third sun gear S3, a third ring gear R3. a third pinion P3 and a third carrier CA3. The third sun gear S3 is coupled to the fourth ring gear R4 and the second sun gear S2. The third ring gear R3 is coupled to the second carrier CA2, and is also selectively coupled to the input shaft 16 via the first clutch C1. The third pinion P3 meshes with the third sun gear S3 and the third ring gear R3. The third carrier CA3 supports the third pinion P3 such that the third pinion P3 is able to rotate about itself and rotate about the axis of the third planetary gear set 110. The third carrier CA3 is also coupled to the first ring gear R1 and the output gear 24.

In the seventh embodiment, a one-way clutch F1 is provided in parallel with the first brake B1 disposed between the first carrier CA1 and the transmission case 12. The first brake B1 and the one-way clutch F1 may be replaced by either of the first brake B1 and the one-way clutch F1.

In the transmission 100 constructed as described above, a selected one of the forward $1^{st}$-speed gear stage through $7^{th}$-speed gear stage and the reverse gear stage is established by engaging two friction devices selected from five friction devices, i.e., the first clutch C1, second clutch C2, first brake B1, second brake B2 and the third brake B3 at the same time, as indicated in the operation table of FIG. 6. Similarly to the transmission 40 of FIG. 5, the gear ratios $\gamma$ of the forward gear stages differ successively at substantially equal ratios (namely, the ratio of the gear ratio $\gamma$ of one of the forward gear stages to that of the next gear stage is substantially constant.)

In the main power transmitting portion 88 of the transmission 100 of the seventh embodiment, parts of the first sun gear S1, first carrier CA1 and the first ring gear R1 of the first planetary gear set 106, the second sun gear S2, second carrier CA2 and the second ring gear R2 of the second planetary gear set 108, and the third sun gear S3, third carrier CA3 and the third ring gear R3 of the third planetary gear set 110 are coupled to each other so as to provide five rotating elements RE1 through RE5, as shown in the monogram of FIG. 13. In the monogram of FIG. 13, the speeds of rotation of the five rotating elements RE1 through RE5 are represented by straight lines, and the first rotating element RE1, second rotating element RE2, third rotating element RE3, fourth rotating element RE4 and the fifth rotating element RE5 are arranged in this order from one end (the left end in FIG. 13) to the other end (the right end in FIG. 13). In the transmission 100 of this embodiment, the first rotating element RE1 (S1) is selectively inhibited from rotating by the second brake B2, and is selectively coupled to the input shaft 16 (input member) via the second clutch C2. The second rotating element RE2 (R2, CA1) is selectively inhibited from rotating by the first brake B1, and the third rotating element RE3 (R3, CA2) is selectively coupled to the input shaft 16 (input member) via the first clutch C1. The fifth rotating element RE5 (S2, S3) is coupled to the fourth ring gear R4 (intermediate rotating member), and the fourth rotating element RE4 (R1, CA3) is coupled to the output gear 24 (output member).

As is apparent from the nomogram of FIG. 13, when the third brake B3 and the first brake B1 are engaged, and the fourth carrier CA4 is inhibited from rotating while the second rotating element RE2 (CA1, R2) is also inhibited from rotating, the fourth rotating element RE4 (R1, CA3) is rotated at a speed denoted by "$1^{st}$" in FIG. 13, so that the $1^{st}$-speed gear stage having the largest gear ratio is established. When the third brake B3 and the second brake B2 are engaged, and the fourth carrier CA4 is inhibited from rotating while the first rotating element RE1 (S1) is also inhibited from rotating, the fourth rotating element RE4 (R1, CA3) is rotated at a speed denoted by "$2^{nd}$" in FIG. 13, so that the $2^{nd}$-speed gear stage having a smaller gear ratio than that of the $1^{st}$-speed gear stage is established. When the second clutch C2 and the third brake B3 are engaged, and the first rotating element RE1 (S1) is rotated at the same speed as the input shaft 16 while the fourth carrier CA4 is inhibited from rotating, the fourth rotating element RE4 (R1, CA3) is rotated at a speed denoted by "$3^{rd}$" in FIG. 13, so that the $3^{rd}$-speed gear stage having a smaller gear ratio than that of the $2^{nd}$-speed gear stage is established. When the first clutch C1 and the third brake B3 are engaged, and the third rotating element RE3 (CA2, R3) is rotated at the same speed as the input shaft 16 while the fourth carrier CA4 is inhibited from rotating, the fourth rotating element RE4 (R1, CA3) is rotated at a speed denoted by "$4^{th}$" in FIG. 13, so that the $4^{th}$-speed gear stage having a smaller gear ratio than that of the $3^{rd}$-speed gear stage is established. When the first clutch C1 and the second clutch C2 are engaged, and the third rotating element RE3 (CA2, R3) is rotated along with the input shaft 16 while the first rotating element RE1 (S1) is also rotated along with the input shaft 16, the fourth rotating element RE4 (R1, CA3) is rotated at a speed denoted by "$5^{th}$" in FIG. 13, namely, at the same speed as the input shaft 16, so that the $5^{th}$-speed gear stage having a smaller gear ratio than that of the $4^{th}$-speed gear stage is established. The gear ratio $\gamma_5$ of the $5^{th}$-speed gear stage is equal to 1. When the first clutch C1 and the second brake B2 are engaged, and the third rotating element RE3 (CA2, R3) is rotated along with the input shaft 16 while the first rotating element RE1 (S1) is inhibited from rotating, the fourth rotating element RE4 (R1, CA3) is rotated at a speed denoted by "$6^{th}$" in FIG. 13, so that the $6^{th}$-speed gear stage having a smaller gear ratio than that of the $5^{th}$-speed gear stage is established. When the first clutch C1 and the first brake B1 are engaged, and the third rotating element RE3 (CA2, R3) is rotated along with the input shaft 16 while the second rotating element RE2 (CA1, R2) is inhibited from rotating, the fourth rotating element RE4 (R1, CA3) is rotated at a speed denoted by "$7^{th}$" in FIG. 13, so that the $7^{th}$-speed gear stage having a smaller gear ratio than that of the $6^{th}$-speed gear stage is established.

When the second clutch C2 and the first brake B1 are engaged, and the first rotating element RE1 (S1) is rotated along with the input shaft 16 while the second rotating element RE2 (CA1, R2) is inhibited from rotating, the fourth rotating element RE4 (R1, CA3) is rotated in the reverse direction at a speed denoted by "REV" in FIG. 13, so that the reverse gear stage "Rev" is established.

As described above, the automatic transmission 100 of the present embodiment is able to establish seven forward gear stages by using five friction devices, i.e., two clutches C1, C2 and three brakes B1, B2 and B3, in a similar manner to the transmission 40 of FIG. 5. Thus, the number of friction devices required for shifting the transmission 100 is reduced, resulting in a reduced number of components and reduced cost. Furthermore, the drag resistance is reduced, and the fuel economy can be further improved.

Figure 14:
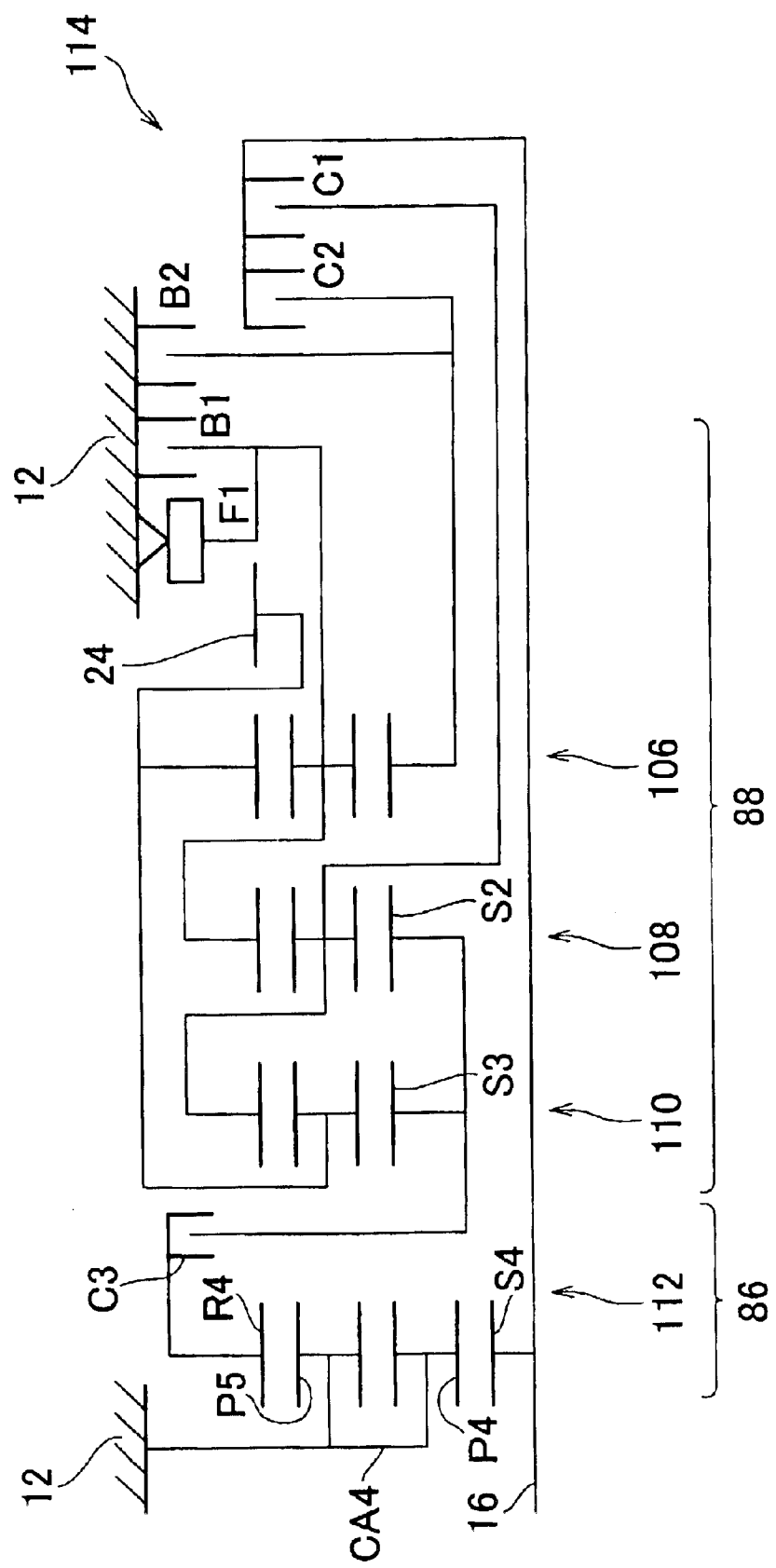
FIG. 14 is a schematic view showing an automatic transmission of a motor vehicle according to an eighth embodiment of the invention, as a modified example of the automatic transmission of FIG. 12.

Next, an eighth embodiment of the invention will be described. FIG. 14 schematically shows the construction of an automatic transmission 114 that provides seven forward gear stages by using five friction devices, like the transmission 100 of the seventh embodiment. The transmission 114 is different from the transmission 110 in that the fourth carrier CA4 of the auxiliary power transmitting portion 86 is directly coupled to the transmission case 12 so as to be inhibited from rotating, and that a third clutch C3 is provided between the fourth ring gear R4 and the second and third sun gears S2, S3, such that the fourth ring gear R4 and the second and third sun gears S2, S3 are selectively coupled to each other. The transmission 114 is similar to the transmission 100 in the other aspects. In the eighth embodiment, the third clutch C3 similar to the third brake B3 of the transmission 100 functions as an intermediate rotation output friction device, and is thus able to establish seven forward gear stages based on an operation table similar to that of FIG. 6 and a nomogram similar to that of FIG. 13, in which the third brake B3 is replaced by the third clutch C3. The rotating elements RE1, RE2, RE3, RE4 and RE5 of this embodiment are identical with those of the transmission 100 of the seventh embodiment.

While the third through eighth embodiments of the invention have been described in detail with reference to FIG. 5 through FIG. 14, the invention may be otherwise embodied.

While the third planetary gear set 52, 80 or the fourth planetary gear set 112 that constitutes the auxiliary power transmitting portion 56, 66, 86 is of a double pinion type in the illustrated embodiments, the third or fourth planetary gear set 52, 80, 112 may be of a single pinion type. Also, any of the third sun gear S3 or the fourth sun gear S4, the third carrier CA3 or the fourth carrier CA4, and the third ring gear R3 or the fourth ring gear R4 corresponding to three rotating elements of the third or fourth planetary gear set 52, 80, 112 may be fixed, or may serve as an intermediate rotating member, or may be directly or indirectly coupled to the input member.

While the automatic transmissions 40, 60, 70, 90, 100, 114 of the illustrated embodiments are suitably installed in the lateral direction on front engine front drive (FF) vehicles in which the axis of the transmission extends in the width direction of the vehicle, the transmissions 40, 60, 70, 90, 100, 114 may be installed in the vertical direction on front engine rear drive (FR) vehicles in which the axis of the transmission extends in the longitudinal or running direction of the vehicle.

While the automatic transmission 40, 60, 70, 90, 100, 114 may automatically change its gear ratio or gear stage depending upon vehicle operating conditions, such as an accelerator pedal position and a vehicle speed, the transmission may change its gear ratio in response to switching operations (e.g., upshifting and downshifting operations) performed by the vehicle operator or driver.

In the automatic transmission 40, 60, 70, 90, 100, 114 as described above, hydraulically operated friction devices of multiple-disc type, single-disc type or belt type, which are frictionally engaged by use of hydraulic actuators, are suitably used as the first clutch C1, second clutch C2, third clutch C3, first brake B1, second brake B2 and the third brake B3. However, other types of engaging devices, such as those of electromagnetic type, may also be used as the clutches and brakes. To make shift control easy, one-way clutches may be provided in parallel with the brakes or clutches. If an engine brake need not be applied, one-way clutches may be used in place of the brakes or clutches. Here, one-way clutches function, like brakes, to stop rotation of corresponding rotating members. Other than the above arrangements, the automatic transmission 40, 60, 70, 90, 100, 114 may be constructed in various ways. For example, a brake and a one-way clutch, which are connected in series, may be provided in parallel with the first brake B1.

In the automatic transmission 40, for example, the positional relationship between the main power transmitting portion 58 and the auxiliary power transmitting portion 56 and the positional relationship between the first planetary gear set 48 and the second planetary gear set 50 of the main power transmitting portion 58 are not particularly limited, but may be changed in various ways. In addition, the clutches and brakes may be located to be concentrated in one end portion of the transmission 40, or may be otherwise positioned. Furthermore, the first planetary gear set 48, second planetary gear set 50 and the third planetary gear set 52 are not necessarily disposed on the same axis.

While the vertical lines Y1, Y2, Y3, Y4, Y5 respectively corresponding to the rotating elements RE1, RE2, RE3, RE4, RE5 are arranged in this order from the left to the right in the nomogram of each of the illustrated embodiments, these vertical lines, Y1, Y2, Y3, Y4, Y5 may be arranged in this order from the right to the left. While the horizontal line X2 corresponding to the rotational speed "1" is located above the horizontal line X1 corresponding to the rotational speed "0" in the nomogram, the horizontal line X2 may be located below the horizontal line X1.

In the third embodiment of FIG. 5, the second pinion P2 of the double-pinion type first planetary gear set 48 and the third pinion P3 of the double-pinion type second planetary gear set 50 are coupled to each other on the same axis such that the pinions P2, P3 are rotated as a unit. While the second pinion P2 and the third pinion P3 have different diameters in the illustrated embodiments, these pinions P2, P3 may have the same diameter. It is also to be understood that the diameter (or the number of teeth) of each of the first pinion P1, second pinion P2, third pinion P3 and the fourth pinion P4 may be changed as needed.

While each of the main power transmitting portions 58, 68 of the third through sixth embodiments of FIG. 5, FIG. 8, FIG. 9 and FIG. 11 is constituted by two planetary gear sets, and the main power transmitting portion 88 of the seventh and eighth embodiments of FIG. 12 and FIG. 14 is constituted by three planetary gear sets, the number of the planetary gear sets is not limited to two or three.

In the main power transmitting portions 58 of the illustrated embodiment, for example, the first rotating element RE1, second rotating element RE2, third rotating element RE3, fourth rotating element RE4, and the fifth rotating element RE5 may be selected from the sun gears, ring gears and carriers of the first planetary gear set 48 and second planetary gear set 50, and those of other planetary gear sets.

Figure 15:
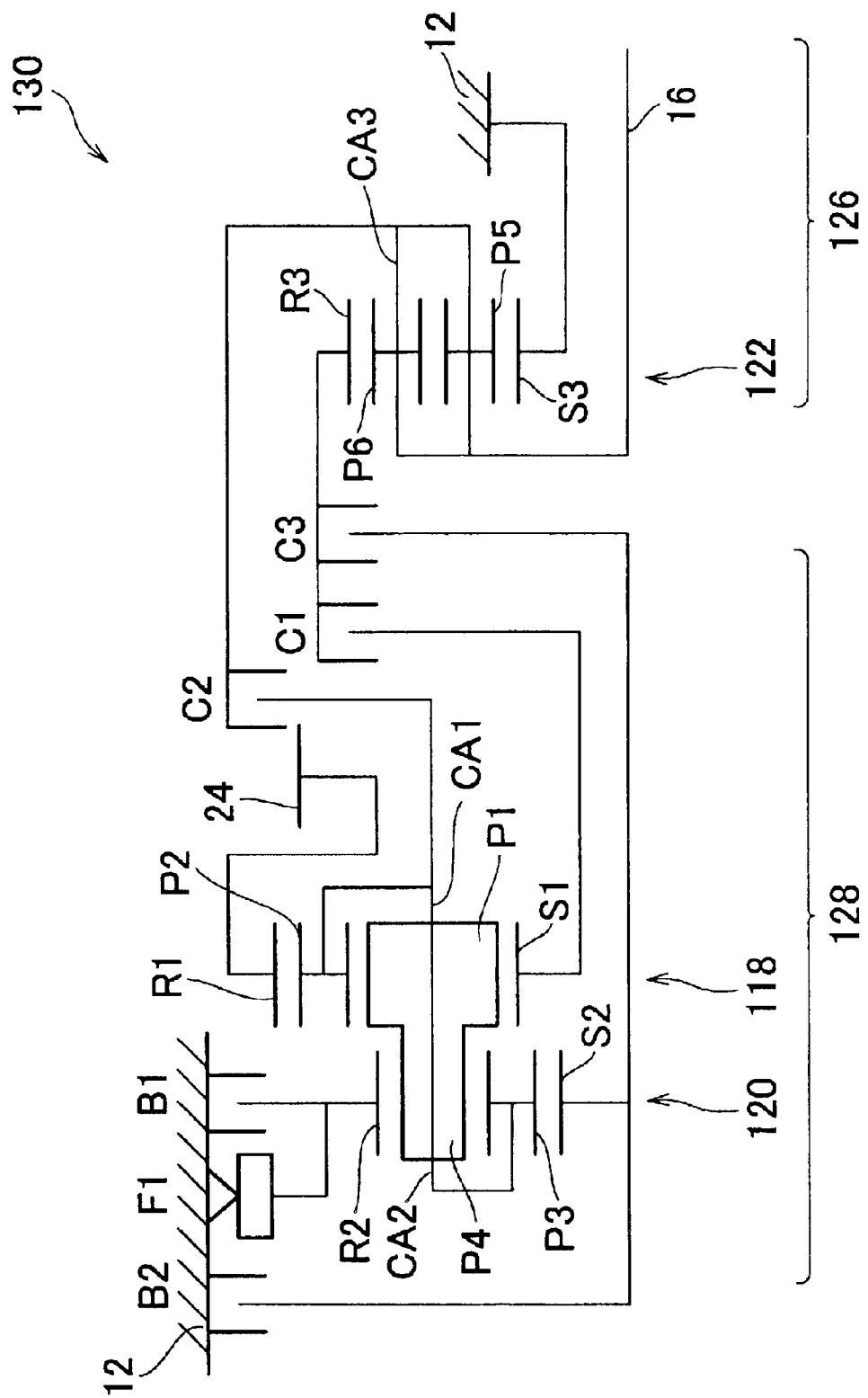
FIG. 15 is a schematic view showing an automatic transmission of a motor vehicle according to a ninth embodiment of the invention.

Next, a ninth embodiment of the invention will be described in detail with reference to FIG. 15, FIG. 16 and FIG. 17. FIG. 15 schematically shows a planetary gear type automatic transmission (hereinafter simply referred to as "transmission") 130 of a motor vehicle according to the ninth embodiment of the invention. FIG. 16 is an operation table indicating engaging devices for establishing each of a plurality of gear stages and the gear ratio of each gear stage. FIG. 17 is a nomogram plotted with respect to the transmission 130 of FIG. 15.

Referring first to FIG. 15, the transmission 130 receives rotary power transmitted from an engine (not shown) to the input shaft 16 thereof, changes the speed of rotation at a given gear ratio, and transmits the resulting power from the output gear 24 to right and left driving wheels, via a propeller shaft (not shown), a differential gear unit (not shown), and other members. The transmission 130 includes a torque converter (not shown) provided with a lockup clutch, the input shaft 16 coupled to the torque converter, a third planetary gear set 122, a first planetary gear set 118, and a second planetary gear set 120, which are arranged on the common axis of rotation within a transmission case (non-rotating member) 12 attached to the vehicle body. The transmission 130 further includes the output gear 24 that is disposed between the third planetary gear set 122 and the first planetary gear set 118. The above-indicated torque converter is coupled to a crankshaft (not shown) of the engine. In this embodiment, the input shaft 16 and the output gear 24 correspond to an input rotating member and an output rotating member, respectively, and the transmission case 12 corresponds to a non-rotating or stationary member. It is to be noted that the transmission 130 is constructed symmetrically with respect to the rotational axis thereof, and that the lower half of the transmission 130 is not shown in FIG. 15 (i.e., only the upper half of the transmission 130 is illustrated in FIG. 15)

The automatic transmission 130 is transversely or laterally installed on, for example, a front engine front drive (FF) vehicle, such that the axis of the transmission 130 extends in the width direction of the vehicle. The transmission 130 includes an auxiliary power transmitting portion 126 that mainly consists of the third planetary gear set 122 of a double pinion type, and a main power transmitting portion 128 that mainly consists of the first planetary gear set 118 of a double pinion type and the second planetary gear set 120 of a double pinion type. The transmission 130 is adapted to establish a selected one of seven forward gear stages having seven different gear ratios $\gamma_n$ and one reverse gear stage, by engaging selected ones of five friction devices. With the selected gear stage thus established, the transmission 130 changes the speed of rotation of the input shaft 16 at a gear ratio corresponding to the gear stage, and transmits the resulting rotary power to the output gear 24.

In the auxiliary power transmitting portion 126, the third planetary gear set 122 includes a third sun gear S3, a third ring gear R3, a fifth pinion P5, a sixth pinion P6 and a third carrier CA3. The third ring gear R3 is disposed coaxially with and radially outwardly of the third sun gear S3. The fifth pinion P5 meshes with the third sun gear S3, and the sixth pinion P6 meshes with the third ring gear R3. The third carrier CA3 supports the fifth pinion P5 and the sixth pinion P6 that mesh with each other, such that the fifth and sixth pinions P5, P6 are able to rotate about themselves and rotate about the axis of the third planetary gear set 122. The third sun gear S3 is coupled to the transmission case 12 so as to be inhibited from rotating. The third carrier CA3 of the third planetary gear set 122 is coupled to the input shaft 16, and is also selectively coupled to a first carrier CA1 of the first planetary gear set 118 via a second clutch C2, so as to transmit rotary power from the input shaft 16 to the main power transmitting portion 128 without changing its speed. The third ring gear R3 of the third planetary gear set 122 is selectively coupled to a first sun gear S1 of the first planetary gear set 118 via a first clutch C1, and is also selectively coupled to a second sun gear S2 of the second planetary gear set 120 via a third clutch C3. Thus, the third ring gear R3 functions as an intermediate rotating member that is rotated at a lower speed than that of the input shaft 16 so as to transmit rotary power to the main power transmitting portion 128 at the reduced speed.

In the main power transmitting portion 128, the first planetary gear set 118 includes the first sun gear S1, a first ring gear R1, a first pinion P1, a second pinion P2 and the first carrier CA1. The first sun gear S1 is selectively coupled to the third ring gear R3 via the first clutch C1. The first ring gear R1 is coupled to the output gear 24, and functions as an output member. The first pinion P1 meshes with the first sun gear S1 and the second pinion P2 meshes with the first ring gear R1. The first carrier CA1 supports the first pinion P1 and the second pinion P2 that mesh with each other, such that the first and second pinions P1, P2 are able to rotate about themselves and rotate about the axis of the first planetary gear set 118. The first carrier CA1 is also selectively coupled to the input shaft 16 via a second clutch C2. The second planetary gear set 120 includes the second sun gear S2, a second ring gear R2, a third pinion P3, a fourth pinion P4 and a second carrier CA2. The second sun gear S2 is selectively coupled to the third ring gear R3 (intermediate rotating member) via the third clutch C3, and is also selectively coupled to the transmission case 12 via a second brake B2. The second ring gear R2 is selectively coupled to the transmission case 12 via a first brake B1 and a one-way clutch F1 that are arranged in parallel with each other. The third pinion P3 meshes with the second sun gear S2, and the fourth pinion P4 meshes with the second ring gear R2. The fourth pinion P4 is coaxially coupled to the first pinion P1 such that the first and fourth pinions P1, P4 rotate as a unit. The second carrier CA2 supports the third pinion P3 and the fourth pinion P4 that mesh with each other, such that the third and fourth pinions P3, P4 are able to rotate about themselves and rotate about the axis of the second planetary gear set 120. Also, the second carrier CA2 is coupled to the first carrier CA1 such that the first and second carriers CA1, CA2 rotate as a unit.

The first clutch C1, second clutch C2, third clutch C3, first brake B1, and the second brake B2 are hydraulically operated friction devices, which may be generally used in conventional planetary gear type automatic transmissions. Each of the friction devices serves to selectively couple two members between which the device is interposed, to each other. For example, the friction device may be of a wet multiple disc type in which a plurality of friction discs or plates that are superposed on each other are pressed by a hydraulic actuator, or may be in the form of a band brake in which one end of one or two band(s) wound around the outer periphery of a rotating drum is strained or drawn in by a hydraulic actuator. The one-way clutch F1 disposed in parallel with the first brake B1 also functions as an engaging device equivalent to the first brake, and only one of the one-way clutch F1 and the first brake B1 may be provided.

In the transmission 130 constructed as described above, a selected one of the forward $1^{st}$-speed gear stage through $7^{th}$-speed gear stage and the reverse gear stage is established by engaging two friction devices selected from the first clutch C1, second clutch C2, third clutch C3, first brake B1, and the second brake B2 at the same time, as indicated in the operation table of FIG. 16 by way of example. As described later, the gear ratios $\gamma$ (=input shaft rotational speed Nin/output shaft rotational speed Nout) of the forward gear stages differ successively at substantially equal ratios (namely, the ratio of the gear ratio $\gamma$ of one of the forward gear stages to that of the next gear stage is substantially constant.)

More specifically described referring to FIG. 16, the $1^{st}$-speed gear stage having the largest gear ratio $\gamma_1$, which is, for example, equal to about 3.77, is established by engaging the first clutch C1 and the first brake B1 so that the third ring gear R3 and the first sun gear S1 are coupled to each other and the second ring gear R2 and the transmission case 12 are coupled to each other. The $2^{nd}$-speed gear stage having a gear ratio $\gamma_2$, which is smaller than the gear ratio $\gamma_1$ and is, for example, equal to about 2.67, is established by engaging the first clutch C1 and the second brake B2 so that the third ring gear R3 and the first sun gear S1 are coupled to each other and the second sun gear S2 and the transmission case 12 are coupled to each other. The $3^{rd}$-speed gear stage having a gear ratio $\gamma_3$, which is smaller than the gear ratio $\gamma_2$ and is, for example, equal to about 1.82, is established by engaging the first clutch C1 and the third clutch C3 so that the third ring gear R3 and the first sun gear S1 are coupled to each other and the third ring gear R3 and the second sun gear S2 are coupled to each other. The $4^{th}$-speed gear stage having a gear ratio $\gamma_4$, which is smaller than the gear ratio $\gamma_3$ and is, for example, equal to about 1.14, is established by engaging the first clutch C1 and the second clutch C2 so that the third ring gear R3 and the first sun gear S1 are coupled to each other and the third carrier CA3 and the first carrier CA1 are coupled to each other. The $5^{th}$-speed gear stage having a gear ratio $\gamma_5$, which is smaller than the gear ratio $\gamma_4$ and is, for example, equal to about 0.91, is established by engaging the second clutch C2 and the third clutch C3 so that the third carrier CA3 and the first carrier CA1 are coupled to each other and the third ring gear R3 and the second sun gear S2 are coupled to each other. The $6^{th}$-speed gear stage having a gear ratio $\gamma_6$, which is smaller than the gear ratio $\gamma_5$ and is, for example, equal to about 0.82, is established by engaging the second clutch C2 and the second brake B2 so that the third carrier CA3 and the first carrier CA1 are coupled to each other and the second sun gear S2 and the transmission case 12 are coupled to each other. The $7^{th}$-speed gear stage having a gear ratio $\gamma_7$, which is smaller than the gear ratio $\gamma_6$ and is, for example, equal to about 0.59, is established by engaging the second clutch C2 and the first brake B1 so that the third carrier CA3 and the first carrier CA1 are coupled to each other and the second ring gear R2 and the transmission case 12 are coupled to each other. The reverse gear stage having a gear ratio $\gamma_R$, which is between the gear ratio $\gamma_2$ and the gear ratio $\gamma_3$ and is, for example, equal to about 2.35, is established by engaging the third clutch C3 and the first brake B1 so that the third ring gear R3 and the second sun gear S2 are coupled to each other and the second ring gear R2 and the transmission case 12 are coupled to each other. The gear ratio (=the number of teeth of the sun gear/the number of teeth of the ring gear) $\rho_1$ of the first planetary gear set 118, the gear ratio $\rho_2$ of the second planetary gear set 120, and the gear ratio $\rho_3$ of the third planetary gear set 122 are determined so as to provide the gear ratios $\gamma_1$–$\gamma_7$ and $\gamma_R$ as indicated above. For example, $\rho_1$ is equal to 0.28, $\rho_2$ is equal to 0.31, and $\rho_3$ is equal to 0.45.

In the transmission 130 as described above, the rate of change of the gear ratio (i.e., ratio of the gear ratios of the adjacent gear stages=$\gamma_n/\gamma_{n+1}$) may be determined as follows: the ratio (=$\gamma_1/\gamma_2$) of the gear ratio $\gamma_1$ of the $1^{st}$-speed gear stage to the gear ratio $\gamma_2$ of the $2^{nd}$-speed gear stage is 1.41, the ratio (=$\gamma_2/\gamma_3$) of the gear ratio $\gamma_2$ of the $2^{nd}$-speed gear stage to the gear ratio $\gamma_3$ of the $3^{rd}$-speed gear stage is 1.47, the ratio (=$\gamma_3/\gamma_4$) of the gear ratio $\gamma_3$ of the $3^{rd}$-speed gear stage to the gear ratio $\gamma_4$ of the $4^{th}$-speed gear stage is 1.59, the ratio (=$\gamma_4/\gamma_5$) of the gear ratio $\gamma_4$ of the $4^{th}$-speed gear stage to the gear ratio $\gamma_5$ of the $5^{th}$-speed gear stage is 1.25, the ratio (=$\gamma_5/\gamma_6$) of the gear ratio $\gamma_5$ of the $5^{th}$-speed gear stage to the gear ratio $\gamma_6$ of the $6^{th}$-speed gear stage is 1.11, and the ratio (=$\gamma_6/\gamma_7$) of the gear ratio $\gamma_6$ of the $6^{th}$-speed gear stage to the gear ratio $\gamma_7$ of the $7^{th}$-speed gear stage is 1.39. Thus, the gear ratios $\gamma$ change at substantially equal ratios or rates. Also, in the transmission 130, the total width of the gear ratios ($\gamma_1/\gamma_7$), namely, the ratio of the gear ratio $\gamma_1$ of the $1^{st}$-speed gear stage to the gear ratio $\gamma_7$ of the $7^{th}$-speed gear stage, is a sufficiently large value, which is, for example, 6.38. Also, the gear ratio of the reverse gear stage "Rev" is an appropriate value. Thus, the transmission 130 provides appropriate gear-ratio (speed-change) characteristics over the entire range of operation.

FIG. 17 is a nomogram in which straight lines represent the relationships of the speeds of rotation of rotating elements (as described later) which are in different coupling states for respective gear stages. The nomogram of FIG. 17 is a two-dimensional coordinate system in which the horizontal axis indicates the relationship among the gear ratios $\rho$ of the respective planetary gear sets 118, 120, 122, and the vertical axis indicates relative rotational speeds. In the nomogram of FIG. 17, the lower horizontal line X1, out of three horizontal lines, indicates rotational speed "0", and the middle horizontal line X3 indicates a rotational speed lower than the speed of rotation of the input shaft 16, while the upper horizontal line X2 indicates rotational speed "1.0", which is equal to the speed of rotation of the input shaft 16. Five vertical lines Y1 through Y5 arranged from the left to the right in the section of the main power transmitting portion 128 respectively represent the second sun gear S2 corresponding to the first rotating element RE1, the second ring gear R2 corresponding to the second rotating element RE2, the first carrier CA1 and the second carrier CA2 that are coupled to each other and correspond to the third rotating element RE3, the first ring gear R1 corresponding to the fourth rotating element RE4, and the first sun gear S1 corresponding to the fifth rotating element RE5. The intervals of these vertical lines are determined in accordance with the gear ratio $\rho_1$ of the first planetary gear set 118 and the gear ratio $\rho_2$ of the second planetary gear set 120. More specifically, the interval between the vertical lines corresponding to the sun gear and the carrier is set as "1", and the interval between the vertical lines corresponding to the carrier and the ring gear is set as "$\rho$".

The main power transmitting portion 128 will be described by utilizing the nomogram of FIG. 17. Parts of the first sun gear S1, first carrier CA1 and the first ring gear R1 of the first planetary gear set 118 and the second sun gear S2, second carrier CA2 and the second ring gear R2 of the second planetary gear set 120 are coupled to each other so as to provide five rotating elements RE1 through RE5. In the monogram of FIG. 17, the speeds of rotation of the five rotating elements RE1 through RE5 are represented by straight lines, and the first rotating element RE1, second rotating element RE2, third rotating element RE3, fourth rotating element RE4 and the fifth rotating element RE5 are arranged in this order from one end (i.e., the left end in FIG. 17) to the other end (i.e., the right end in FIG. 17). In the transmission 130 of this embodiment, the first rotating element RE1 (S2) is selectively inhibited from rotating by the second brake B2, and the second rotating element RE2 (R2) is selectively inhibited from rotating by the first brake B1. The first rotating element RE1 (S2) is selectively coupled to the third ring gear R3 (intermediate rotating member) via the third clutch C3. The third rotating element RE3 (CA1, CA2) is selectively coupled to the input shaft 16 (input member) via the second clutch C2 and the third carrier CA3. The fifth rotating element RE5 (S1) is selectively coupled to the third ring gear R3 (intermediate rotating member) via the first clutch C1, and the fourth rotating element RE4 (R1) is coupled to the output gear 24 (output member).

As is apparent from the nomogram of FIG. 17, when the first clutch C1 and the first brake B1 are engaged, and the fifth rotating element RE5 (S1) is coupled to the third ring gear R3 so as to be rotated at a lower speed than the input shaft 16 via the auxiliary power transmitting portion 126 while the second rotating element RE2 (R2) is inhibited from rotating, the fourth rotating element RE4 (R1) is rotated at a speed denoted by "$1^{st}$" in FIG. 17, so that the $1^{st}$-speed gear stage having the largest gear ratio is established. When the first clutch C1 and the second brake B2 are engaged, and the fifth rotating element RE5 (S1) is coupled to the third ring gear R3 so as to be rotated at a lower speed than the input shaft 16 while the first rotating element RE1 (S2) is inhibited from rotating, the fourth rotating element RE4 (R1) is rotated at a speed denoted by "$2^{nd}$" in FIG. 17, so that the $2^{nd}$-speed gear stage having a smaller gear ratio than that of the $1^{st}$-speed gear stage is established. When the first clutch C1 and the third clutch C3 are engaged, and the main power transmitting portion 128 as a whole is rotated at a reduced speed along with the third ring gear R3 of the auxiliary power transmitting portion 126, the fourth rotating element RE4 (R1) is rotated at a speed denoted by "$3^{rd}$" in FIG. 17, namely, at the same speed as the third ring gear R3 of the auxiliary power transmitting portion 126, so that the $3^{rd}$-speed gear stage having a smaller gear ratio than that of the $2^{nd}$-speed gear stage is established. When the first clutch C1 and the second clutch C2 are engaged, and the fifth rotating element RE5 (S1) is coupled to the third ring gear R3 so as to be rotated at a lower speed than the input shaft 16 via the auxiliary power transmitting portion 126 while the third rotating element RE3 (CA1, CA2) is rotated along with the input shaft 16, the fourth rotating element RE4 (R1) is rotated at a speed denoted by "$4^{th}$" in FIG. 17, so that the $4^{th}$-speed gear stage having a smaller gear ratio than that of the $3^{rd}$-speed gear stage is established. When the second clutch C2 and the third clutch C3 are engaged, and the third rotating element RE3 (CA1, CA2) is rotated along with the input shaft 16 while the first rotating element RE1 (S2) is rotated at a reduced speed, the fourth rotating element RE4 (R1) is rotated at a speed denoted by "$5^{th}$" in FIG. 17, so that the $5^{th}$-speed gear stage having a smaller gear ratio than that of the $4^{th}$-speed gear stage is established. When the second clutch C2 and the second brake B2 are engaged, and the third rotating element RE3 (CA1, CA2) is rotated along with the input shaft 16 while the first rotating element RE1 (S2) is inhibited from rotating, the fourth rotating element RE4 (R1) is rotated at a speed denoted by "$6^{th}$" in FIG. 17, so that the $6^{th}$-speed gear stage having a smaller gear ratio than that of the $5^{th}$-speed gear stage is established. When the second clutch C2 and the first brake B1 are engaged, and the third rotating element RE3 (CA1, CA2) is rotated along with the input shaft 16 while the second rotating element RE2 (R2) is inhibited from rotating, the fourth rotating element RE4 (R1) is rotated at a speed denoted by "$7^{th}$" in FIG. 17, so that the $7^{th}$-speed gear stage having a smaller gear ratio than that of the $6^{th}$-speed gear stage is established.

When the third clutch C3 and the first brake B1 are engaged, and the first rotating element RE1 (S2) is rotated at a lower speed than the input shaft 16 while the second rotating element RE2 (R2) is inhibited from rotating, the fourth rotating element RE4 (R1) is rotated in the reverse direction at a speed denoted by "REV" in FIG. 17, so that the reverse gear stage "Rev" is established.

As described above, the automatic transmission 130 of the present embodiment is able to establish seven forward gear stages by using three gear sets, i.e., the first planetary gear set 118, second planetary gear set 120, and the third planetary gear set 122, and a total of five friction devices, i.e., three clutches C1, C2 and C3 and two brakes B1 and B2. Thus, the weight and size of the transmission 130 can be reduced as compared with the case where four planetary gear sets are used, thus making it easier to install the transmission 130 on the vehicle. At the same time, the number of friction devices required for shifting the transmission 130 is reduced, resulting in a reduced number of components and reduced cost. Furthermore, the drag resistance is reduced, and the fuel economy can be further improved.

In the ninth embodiment as described above, the first pinion P1 of the double-pinion type first planetary gear set 118 and the fourth pinion P4 of the double-pinion type second planetary gear set 120 are coupled to each other on the same axis so that these pinions P1, P4 are rotated as a unit. Like Ravigneaux type planetary gear trains, this arrangement requires a further reduced number of components and further reduced axial length, which result in further reduction in the size and cost of the transmission 130.

Also, the gear ratios $\rho_1$, $\rho_2$ and $\rho_3$ of the first planetary gear set 118, second planetary gear set 120 and the third planetary gear set 122 are set within the range of about 0.3 to 0.6. Thus, the transmission 130 is able to provide appropriate speed-change characteristics as a whole as shown in FIG. 16, while permitting the planetary gear sets 118, 120 and 122 to be relatively small sized or have relatively small diameters.

While the ninth embodiment of the invention has been described referring to FIG. 15–FIG. 17, the invention may be otherwise embodied.

While the third planetary gear set 122 is of a double pinion type in the ninth embodiment, the third planetary gear set 122 may be of a single pinion type. Also, any of the third sun gear S3, third carrier CA3 and the third ring gear R3 corresponding to three rotating elements of the third planetary gear set 122 may be fixed, or may serve as an intermediate rotating member, or may be directly or indirectly coupled to the input member.

While the automatic transmission 130 of the ninth embodiment is suitably installed in the lateral direction on the front engine front drive (FF) vehicle in which the axis of the transmission 130 extends in the width direction of the vehicle, the transmissions 130 may be installed in the vertical direction on a front engine rear drive (FR) vehicle in which the axis of the transmission 130 extends in the longitudinal or running direction of the vehicle.

While the automatic transmission 130 may automatically change its gear ratio or gear stage depending upon vehicle operating conditions, such as an accelerator pedal position and a vehicle speed, the transmission 130 may change its gear ratio in response to switching operations (e.g., upshifting and downshifting operations) performed by the vehicle operator or driver.

In the automatic transmission 130 as described above, hydraulically operated friction devices of multiple-disc type, single-disc type or belt type, which are frictionally engaged by use of hydraulic actuators, are suitably used as the first clutch C1, second clutch C2, third clutch C3, first brake B1 and the second brake B2. However, other types of engaging devices, such as those of electromagnetic type, may also be used as the clutches and brakes. To make shift control easy, one-way clutches may be provided in parallel with the brakes or clutches. If an engine brake need not be applied, one-way clutches may be used in place of the brakes or clutches. Here, one-way clutches function, like brakes, to stop rotation of corresponding rotating members. Other than the above arrangements, the automatic transmission 130 may be constructed in various ways. For example, a brake and a one-way clutch, which are connected in series, may be provided in parallel with the first brake B1.

In the automatic transmission 130, the positional relationship between the main power transmitting portion 128 and the auxiliary power transmitting portion 126 and the positional relationship between the first planetary gear set 118 and the second planetary gear set 120 of the main power transmitting portion 128 are not particularly limited, but may be changed in various ways. In addition, the clutches and brakes may be located to be concentrated in one end portion of the transmission 130, or may be otherwise positioned. Furthermore, the first planetary gear set 118, second planetary gear set 120 and the third planetary gear set 122 are not necessarily disposed on the same axis.

While the vertical lines Y1, Y2, Y3, Y4, Y5 respectively corresponding to the rotating elements RE1, RE2, RE3, RE4, RE5 are arranged in this order from the left to the right in the nomogram of FIG. 17 in the ninth embodiment, these vertical lines, Y1, Y2, Y3, Y4, Y5 may be arranged in this order from the right to the left. While the horizontal line X2 corresponding to the rotational speed "1" is located above the horizontal line X1 corresponding to the rotational speed "0" in the nomogram of FIG. 17, the horizontal line X2 may be located below the horizontal line X1.

In the illustrated embodiment, the first pinion P1 of the double-pinion type first planetary gear set 118 and the fourth pinion P4 of the double-pinion type second planetary gear set 120 are coupled to each other on the same axis such that the pinions P1, P4 are rotated as a unit. While the first pinion P1 and the fourth pinion P4 have different diameters in the illustrated embodiment, these pinions P1, P4 may have the same diameter. It is also to be understood that the diameter (or the number of teeth) of each of the first pinion P1, second pinion P2, third pinion P3 and the fourth pinion P4 may be changed as needed.

While the main power transmitting portion 128 is constituted by two planetary gear sets, i.e., the first planetary gear set 118 and the second planetary gear set 120, in the ninth embodiment, the number of the planetary gear sets is not limited to two, but may be three or greater.

In the main power transmitting portion 128 of the illustrated embodiment, the first rotating element RE1, second rotating element RE2, third rotating element RE3, fourth rotating element RE4, and the fifth rotating element RE5 may be selected from the sun gears, ring gears and carriers of the first planetary gear set 118 and second planetary gear set 120, and those of other planetary gear sets.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An automatic transmission of a motor vehicle, comprising:

an input member;

an output member;

an auxiliary power transmitting portion including a planetary gear set having three rotating elements, wherein when one of the three rotating elements is coupled to and rotated with the input member, and another one of the rotating elements is fixed to be inhibited from rotating, the remaining rotating element serving as an intermediate rotating element is rotated at a reduced speed as compared with that of the input member, the auxiliary power transmitting portion further including an intermediate rotation output friction device that is operable, when engaged, to permit the intermediate rotating element to output rotary power at the reduced speed; and a main power transmitting portion including a plurality of planetary gear sets including sun gears, carriers and ring gears, parts of which are coupled to each other to provide a first rotating element, a second rotating element, a third rotating element, a fourth rotating element and a fifth rotating element, which are arranged in the order of description from one end to the other end in a nomogram in which speeds of rotation of the first, second, third, fourth and fifth rotating elements are represented by straight lines, the main power transmitting portion further including a first brake, a second brake, a first clutch and a second clutch, wherein the first rotating element is selectively coupled to the input member via the second clutch and is selectively inhibited from rotating by the second brake, the second rotating element is selectively inhibited from rotating by the first brake, the third rotating element is selectively coupled to the input member via the first clutch, the fifth rotating element is coupled to or selectively coupled to the intermediate output member, and the fourth rotating element is coupled to the output member so as to output rotary power from the main power transmitting portion, wherein a first-speed gear stage having the largest gear ratio is established when the intermediate rotation output friction device and the first brake are engaged, a second-speed gear stage having a smaller gear ratio than that of the first-speed gear stage is established when the intermediate rotation output friction device and the second brake are engaged, a third-speed gear stage having a smaller gear ratio than that of the second-speed gear stage is established when the second clutch and the intermediate rotation output friction device are engaged, a fourth-speed gear stage having a smaller gear ratio than that of the third-speed gear stage is established when the first clutch and the intermediate rotation output friction device are engaged, a fifth-speed gear stage having a smaller gear ratio than that of the fourth-speed gear stage is established when the first clutch and the second clutch are engaged, a sixth-speed gear stage having a smaller gear ratio than that of the fifth-speed gear stage is established when the first clutch and the second brake are engaged, and a seventh-speed gear stage having a smaller gear ratio than that of the sixth-speed gear stage is established when the first clutch and the first brake are engaged.

2. The automatic transmission according to claim 1, wherein the main power transmitting portion comprises:

a first planetary gear set as one of the plurality of planetary gear sets including a first sun gear, a first ring gear, a first pinion, a second pinion and a first carrier, in which the first sun gear selectively receives rotary power from the intermediate rotating member at the reduced speed, the first ring gear is selectively coupled to the input member via the first clutch, and the first carrier rotatably supports the first pinion that meshes with the first sun gear and the second pinion that meshes with the first ring gear and is selectively coupled to a non-rotating member via the first brake; and a second planetary gear set as one of the plurality of planetary gear sets including a second sun gear, a second ring gear, a third pinion and a second carrier, in which the second sun gear is selectively coupled to the input member via the second clutch and is selectively coupled to the non-rotating member via the second brake, the second ring gear is coupled to the output member, the third pinion is coaxially coupled to and rotated as a unit with the second pinion and meshes with the second sun gear and the second ring gear, and the second carrier rotatably supports the third pinion and is coupled to the first carrier, wherein the first rotating element comprises the second sun gear, the second rotating element comprises the first carrier and the second carrier, the third rotating element comprises the first ring gear, the fourth rotating element comprises the second ring gear, and the fifth rotating element comprises the first sun gear.

3. The automatic transmission according to claim 2, wherein the planetary gear set of the auxiliary power transmitting portion is a double-pinion type planetary gear set including a third sun gear, a third ring gear, a fourth pinion that meshes with the third sun gear, a fifth pinion that meshes with the third ring gear, and a third carrier, in which the third sun gear is selectively coupled to the non-rotating member by a third brake as the intermediate rotation output friction device, the third ring gear is coupled to the fifth rotating element and functions as the intermediate rotating member, and the third carrier is coupled to the input member and rotatably supports the fourth pinion and the fifth pinion that mesh with each other.

4. The automatic transmission according to claim 2, wherein the planetary gear set of the auxiliary power transmitting portion is a double-pinion type planetary gear set including a sun gear, a ring gear, a fourth pinion that mesh with the sun gear, a fifth pinion that meshes with the ring gear, and a carrier, in which the sun gear is coupled to the non-rotating member, the ring gear is selectively coupled to the fifth rotating element via a third clutch and functions as the intermediate rotating member, and the carrier is coupled to the input member and rotatably supports the fourth pinion and the fifth pinion that mesh with each other.

5. The automatic transmission according to claim 1, wherein the main power transmitting portion comprises:

a first planetary gear set as one of the plurality of planetary gear sets including a first sun gear, a first ring gear, a first pinion that meshes with the first sun gear, a second pinion that meshes with the first pinion and the first ring gear, and a first carrier, in which the first sun gear is selectively coupled to the input member via the second clutch and is selectively coupled to a non-rotating member via the second brake, the first ring gear is selectively coupled to the input member via the first clutch, and the first carrier rotatably supports the first pinion and the second pinion and selectively receives rotary power from the intermediate rotating member at the reduced speed; and a second planetary gear set as one of the plurality of planetary gear sets including a second sun gear, a second ring gear, a third pinion, a fourth pinion and a second carrier, in which the second sun gear is selectively coupled to the non-rotating member via the first brake, the second ring gear is coupled to the output member, the third pinion is coaxially coupled to and rotated as a unit with the first pinion and meshes with the second sun gear, the fourth pinion meshes with the third pinion and the second ring gear, and the second carrier rotatably supports the third pinion and the fourth pinion and is coupled to the first carrier, wherein the first rotating element comprises the first sun gear, the second rotating element comprises the second sun gear, the third rotating element comprises the first ring gear, the fourth rotating element comprises the second ring gear, and the fifth rotating element comprises the first carrier and the second carrier.

6. The automatic transmission according to claim 5, wherein the planetary gear set of the auxiliary power transmitting portion is a double-pinion type planetary gear set including a sun gear, a ring gear, a fifth pinion that meshes with the sun gear, a sixth pinion that meshes with the ring gear, and a carrier, in which the sun gear is coupled to the input member, the ring gear is coupled to the fifth rotating element and functions as the intermediate rotating member, and the carrier rotatably supports the fifth pinion and the sixth pinion that mesh with each other and is selectively coupled to the non-rotating member via a third brake.

7. The automatic transmission according to claim 5, wherein the planetary gear set of the auxiliary power transmitting portion is a double-pinion type planetary gear set including a sun gear, a ring gear, a fifth pinion that mesh with the sun gear, a sixth pinion that meshes with the ring gear, and a carrier, in which the sun gear is coupled to the input member, the ring gear is selectively coupled to the fifth rotating element via a third clutch and functions as the intermediate rotating member, and the carrier is coupled to the non-rotating member and rotatably supports the fifth pinion and the sixth pinion that mesh with each other.

8. The automatic transmission according to claim 1, wherein the main power transmitting portion comprises:

a first planetary gear set as one of the plurality of planetary gear sets including a first sun gear, a first ring gear, a first pinion that meshes with the first sun gear and the first ring gear, and a first carrier, in which the first sun gear is selectively coupled to the input member via the second clutch and is selectively coupled to a non-rotating member via the second brake, the first ring gear is coupled to the output member, and the first carrier rotatably supports the first pinion, is coupled to the second ring gear and is selectively coupled to the non-rotating member via the first brake;

a second planetary gear set as one of the plurality of planetary gear sets including a second sun gear, a second ring gear, a second pinion that meshes with the second sun gear and the second ring gear, and a second carrier, in which the second sun gear selectively receives rotary power from the intermediate rotating member at the reduced speed, the second ring gear is coupled to the first carrier, and the second carrier rotatably supports the second pinion and is selectively coupled to the input member via the first clutch; and a third planetary gear set as one of the plurality of planetary gear sets including a third sun gear, a third ring gear, a third pinion that meshes with the third sun gear and the third ring gear, and a third carrier, in which the third sun gear is coupled to the second sun gear, the third ring gear is coupled to the second carrier and is selectively coupled to the input member via the first clutch, and the third carrier rotatably supports the third pinion and is coupled to the output member and the first ring gear, wherein the first rotating element comprises the first sun gear, the second rotating element comprises the first carrier and the second ring gear, the third rotating element comprises the second carrier and the third ring gear, the fourth rotating element comprises the third carrier and the first ring gear, and the fifth rotating element comprises the second sun gear and the third sun gear.

9. The automatic transmission according to claim 8, wherein the planetary gear set of the auxiliary power transmitting portion is a double-pinion type planetary gear set including a sun gear, a ring gear, a fourth pinion that meshes with the sun gear, a fifth pinion that meshes with the fourth pinion and the ring gear, and a carrier, in which the sun gear is coupled to the input member, the ring gear is coupled to the second sun gear and the third sun gear and functions as the intermediate rotating member, and the carrier rotatably supports the fourth pinion and the fifth pinion that mesh with each other and is selectively coupled to the non-rotating member via the third brake.

10. The automatic transmission according to claim 8, wherein the planetary gear set of the auxiliary power transmitting portion is a double-pinion type planetary gear set including a sun gear, a ring gear, a fourth pinion that mesh with the sun gear, a fifth pinion that meshes with the fourth pinion and the ring gear, and a carrier, in which the sun gear is coupled to the input member, the ring gear is selectively coupled to the second sun gear and the third sun gear via a third clutch and functions as the intermediate rotating member, and the carrier is coupled to the non-rotating member and rotatably supports the fourth pinion and the fifth pinion that mesh with each other.

* * * * *